US011060400B1

(12) United States Patent
Jamison et al.

(10) Patent No.: US 11,060,400 B1
(45) Date of Patent: Jul. 13, 2021

(54) METHODS TO ACTIVATE DOWNHOLE TOOLS

(71) Applicant: Halliburton Energy Services, Inc., Houston, TX (US)

(72) Inventors: Dale E. Jamison, Humble, TX (US); William Walter Shumway, Spring, TX (US); Preston Andrew May, Porter, TX (US); Jay Paul Deville, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/879,172

(22) Filed: May 20, 2020

(51) Int. Cl.
| | | |
|---|---|---|
| *E21B 49/08* | (2006.01) | |
| *E21B 23/00* | (2006.01) | |
| *G01N 29/02* | (2006.01) | |
| *E21B 43/14* | (2006.01) | |

(52) U.S. Cl.
CPC .......... *E21B 49/0875* (2020.05); *E21B 23/00* (2013.01); *E21B 49/081* (2013.01); *G01N 29/022* (2013.01); *E21B 43/14* (2013.01)

(58) Field of Classification Search
CPC ....... E21B 49/08; E21B 49/0875; E21B 43/16
See application file for complete search history.

(56) References Cited

U.S. PATENT DOCUMENTS

| | | |
|---|---|---|
| 4,491,524 A | 1/1985 | Gutierrez et al. |
| 4,635,735 A | 1/1987 | Crownover |
| 5,719,324 A | 2/1998 | Thundat et al. |
| 5,780,727 A | 7/1998 | Gimzewski et al. |
| 5,822,473 A | 10/1998 | Magel et al. |
| 5,925,822 A | 7/1999 | Naughton |
| 6,176,323 B1 | 1/2001 | Weirich et al. |
| 6,402,302 B1 | 6/2002 | Ozaki et al. |
| 6,457,360 B1 | 10/2002 | Daraktchiev et al. |
| 6,664,540 B2 | 12/2003 | Shimizu et al. |
| 6,925,392 B2 | 8/2005 | McNeil, III et al. |
| 7,392,697 B2 | 7/2008 | Chikenji et al. |
| 7,434,457 B2 | 10/2008 | Goodwin et al. |
| 7,458,257 B2 | 12/2008 | Pop et al. |
| 7,595,876 B2 | 9/2009 | DiFoggio |
| 7,687,108 B2 | 3/2010 | Xu et al. |

(Continued)

FOREIGN PATENT DOCUMENTS

TW 273222 B 2/2007

OTHER PUBLICATIONS

Office Action dated Aug. 28, 2020 (18 pages), U.S. Appl. No. 16/879,170, filed May 20, 2020.

(Continued)

*Primary Examiner* — Robert E Fuller
(74) *Attorney, Agent, or Firm* — Conley Rose, P.C.; Rodney B. Carroll

(57) ABSTRACT

A method including determining a concentration of one or more components of a fluid during a wellbore servicing operation of a wellbore, and providing a trigger signal to actuate mechanical operation of a tool based on the determining of the concentration of the one or more components. The determining of the concentration of the one or more components includes contacting a sample of the fluid with a microelectromechanical system (MEMS) device to provide a sample response indicative of the concentration of the one or more components.

20 Claims, 7 Drawing Sheets

(56) References Cited

U.S. PATENT DOCUMENTS

| | | |
|---|---|---|
| 7,712,527 B2 | 5/2010 | Roddy |
| 7,748,266 B2 | 7/2010 | Evrard et al. |
| 7,814,782 B2 | 10/2010 | DiFoggio |
| 8,065,907 B2 | 11/2011 | Colquhoun |
| 8,297,353 B2 | 10/2012 | Roddy et al. |
| 8,302,686 B2 | 11/2012 | Roddy et al. |
| 8,316,936 B2 | 11/2012 | Roddy et al. |
| 8,513,042 B2 | 8/2013 | Perruchot et al. |
| 8,528,396 B2 | 9/2013 | Wu et al. |
| 8,542,365 B2 | 9/2013 | Pruessner et al. |
| 8,542,353 B2 | 11/2013 | Christian et al. |
| 8,575,541 B1 | 11/2013 | Jamison et al. |
| 8,684,109 B2 | 4/2014 | Orbell et al. |
| 8,848,197 B2 | 9/2014 | Pruessner et al. |
| 8,904,859 B2 | 12/2014 | Lawrence et al. |
| 9,000,358 B2 | 4/2015 | Jamison et al. |
| 9,335,271 B2 | 5/2016 | Pruessner et al. |
| 9,335,438 B2 | 5/2016 | Jamison et al. |
| 9,518,434 B1 | 12/2016 | Champness et al. |
| 9,547,968 B2 | 1/2017 | Adams et al. |
| 9,567,852 B2 | 2/2017 | Jamison et al. |
| 9,922,517 B2 | 3/2018 | Adams et al. |
| 10,358,914 B2 | 7/2019 | Roberson et al. |
| 10,442,986 B2 | 10/2019 | He et al. |
| 10,453,321 B2 | 10/2019 | Adams et al. |
| 2002/0194906 A1 | 12/2002 | Goodwin et al. |
| 2004/0045350 A1 | 3/2004 | Jones et al. |
| 2004/0097002 A1 | 5/2004 | Pogge et al. |
| 2004/0201012 A1 | 10/2004 | Faris |
| 2005/0087336 A1* | 4/2005 | Surjaatmadja ..... B01D 17/0217 166/105.5 |
| 2005/0241382 A1 | 11/2005 | Coenen |
| 2007/0033990 A1 | 2/2007 | Grey et al. |
| 2008/0283294 A1 | 11/2008 | Colquhoun |
| 2009/0120168 A1 | 5/2009 | Harrison et al. |
| 2009/0250264 A1 | 10/2009 | Dupriest |
| 2009/0320992 A1 | 12/2009 | Xu et al. |
| 2010/0025784 A1 | 2/2010 | Desai et al. |
| 2010/0192684 A1 | 8/2010 | Wu et al. |
| 2010/0238454 A1 | 9/2010 | Pruessner et al. |
| 2011/0052116 A1* | 3/2011 | Boersma ............ G01D 5/35303 385/12 |
| 2011/0107852 A1 | 5/2011 | Edwards |
| 2011/0192592 A1 | 8/2011 | Roddy et al. |
| 2011/0192594 A1 | 8/2011 | Roddy et al. |
| 2011/0192597 A1 | 8/2011 | Roddy et al. |
| 2012/0013335 A1 | 1/2012 | Saasen et al. |
| 2012/0024602 A1 | 2/2012 | Larson |
| 2012/0056308 A1 | 3/2012 | Perruchot et al. |
| 2012/0092175 A1 | 4/2012 | Adams et al. |
| 2012/0145456 A1 | 6/2012 | Rowden |
| 2012/0304758 A1 | 12/2012 | Kumar |
| 2013/0089465 A1 | 4/2013 | Lazzarino et al. |
| 2013/0119489 A1 | 5/2013 | Chang et al. |
| 2013/0153296 A1 | 6/2013 | Aphale et al. |
| 2013/0174642 A1 | 7/2013 | Bourton et al. |
| 2013/0192360 A1 | 8/2013 | Jamison et al. |
| 2013/0213647 A1 | 8/2013 | Roddy et al. |
| 2013/0030232 A1 | 12/2013 | Pruessner et al. |
| 2013/0332089 A1 | 12/2013 | Kulkarni et al. |
| 2014/0166361 A1 | 6/2014 | Jamison et al. |
| 2014/0172177 A1 | 6/2014 | Jamison et al. |
| 2014/0202689 A1* | 7/2014 | Walton ..................... E21B 34/06 166/250.01 |
| 2014/0238114 A1 | 8/2014 | Klasner |
| 2014/0262510 A1 | 9/2014 | Beddoes et al. |
| 2014/0367092 A1 | 12/2014 | Roberson et al. |
| 2015/0066371 A1 | 3/2015 | Brannigan et al. |
| 2015/0211350 A1 | 7/2015 | Norman et al. |
| 2015/0268374 A1 | 9/2015 | Rapoport |
| 2016/0040524 A1 | 2/2016 | Ravi et al. |
| 2016/0108687 A1 | 4/2016 | Rapoport |
| 2016/0252454 A1 | 9/2016 | Zuo et al. |
| 2016/0290131 A1 | 10/2016 | Mitchell et al. |
| 2016/0312551 A1 | 10/2016 | Rowe et al. |
| 2016/0315090 A1 | 10/2016 | Fox et al. |
| 2016/0362972 A1 | 12/2016 | Dykstra et al. |
| 2017/0069187 A1 | 3/2017 | Adams et al. |
| 2017/0159370 A1 | 6/2017 | Evans et al. |
| 2017/0167255 A1 | 6/2017 | Zhang et al. |
| 2017/0299584 A1 | 10/2017 | Adams |
| 2017/0343969 A1 | 11/2017 | Dykstra et al. |
| 2017/0356282 A1 | 12/2017 | Close et al. |
| 2018/0010446 A1 | 1/2018 | Roberson |
| 2018/0010449 A1 | 1/2018 | Roberson et al. |
| 2018/0023355 A1 | 1/2018 | Teodorescu et al. |
| 2018/0030824 A1 | 2/2018 | Roberson et al. |
| 2018/0082090 A1 | 3/2018 | Roberson et al. |
| 2018/0174418 A1 | 6/2018 | Adams et al. |
| 2019/0227048 A1 | 7/2019 | Ye et al. |
| 2019/0376386 A1 | 12/2019 | Wright et al. |
| 2020/0166478 A1 | 5/2020 | Mohr et al. |
| 2020/0362694 A1 | 11/2020 | Al-Rubaii et al. |
| 2020/0362695 A1 | 11/2020 | Al-Rubaii et al. |
| 2020/0371084 A1 | 11/2020 | Havenga et al. |

OTHER PUBLICATIONS

Filing Receipt, Specification and Drawings for U.S. Appl. No. 16/670,886, filed Oct. 31, 2019, entitled "Focused Formation Sampling Method and Apparatus," 76 pages.

Electronic Filing Acknowledgement Receipt, Specification and Drawings for U.S. Appl. No. 16/879,167, filed May 20, 2020, entitled "Methods to Characterize Wellbore Fluid Composition and Provide Optimal Additive Dosing Using MEMS Technology," 57 pages.

Filing Receipt, Specification and Drawings for U.S. Appl. No. 16/879,170, filed May 20, 2020, entitled "Methods to Characterize Subterranean Fluid Composition and Adjust Operating Conditions Using MEMS Technology," 110 pages.

Office Action dated Dec. 17, 2020 (38 pages), U.S. Appl. No. 16/879,167, filed May 20, 2020.

Battiston, F.M. et al., "A chemical sensor based on a microfabricated cantilever array with simultaneous resonance-frequency and bending readout", Sensors and Actuators, 2001, pp. 122-131, vol. B, No. 77, Elsevier Science, B.V.

Joshi, Priyanka et al., "Distributed MEMS Mass-Sensor Based on Piezoelectric Resonant Micro-Cantilevers," Journal of Microelectromechanical System, Jun. 2019, pp. 382-389, vol. 28, No. 3, IEEE.

Norouzi, Maziar et al., "Design of Piezoelectric Microcantilever Chemical Sensors in Comsol Multiphysics Area," Islamic Azad University, 2009, pp. 184-188.

Redburn, H. et al., "Field Lubricity Measurements Conilate with Improved Performance of Novel Water-Based Drilling Fluid," 11th Offshore Mediterranean Conference and Exhibition, Mar. 2013, 13 pages, OMC.

Vos, Bart E. et al., "The Benefits of Monitoring Torque & Drag in Real Time," IADC/SPE Pacific Drilling Technology Conference, Sep. 2000, 8 pages, IADC/SPE Asia Pacific Drilling Technology.

Foreign Communication from Related Application—International Search Report and Written Opinion of the International Searching Authority, International Application No. PCT/US2020/034694, dated Oct. 20, 2020, 11 pages.

Office Action dated Oct. 23, 2020 (18 pages), U.S. Appl. No. 16/879,170, filed May 20, 2020.

Advisory Action dated Dec. 15, 2020 (11 pages), U.S. Appl. No. 16/879,170, filed May 20, 2020.

Notice of Allowance and Fees Due dated Jan. 13, 2021 (15 pages), U.S. Appl. No. 16/879,170, filed May 20, 2020.

Foreign Communication from Related Application—International Search Report and Written Opinion of the International Searching Authority, International Application No. PCT/US2020/034692, dated Feb. 2, 2021, 13 pages.

Foreign Communication from Related Application—International Search Report and Written Opinion of the International Searching Authority, International Application No. PCT/US2020/034693, dated Feb. 10, 2021, 10 pages.

(56) References Cited

OTHER PUBLICATIONS

Zhao, Libo et al., "A MEMS Resonant Sensor to Measure Fluid Density and Viscosity under Flexural and Torsional Vibrating Modes," Sensors, 2016, vol. 16, MDPI, 15 pages.
Final Office Action dated Mar. 23, 2021 (36 pages), U.S. Appl. No. 16/879,167, filed May 20, 2020.
Office Action dated May 6, 2021 (18 pages), U.S. Appl. No. 16/879,167, filed May 20, 2020.
Final Office Action dated Jun. 7, 2021 (25 pages), U.S. Appl. No. 16/879,167 filed May 20, 2020.

* cited by examiner

US 11,060,400 B1

METHODS TO ACTIVATE DOWNHOLE TOOLS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present disclosure relates generally to methods of servicing a wellbore. More specifically, it relates to wellbore servicing methods including determining a concentration of one or more components of a fluid during a wellbore servicing operation via a microelectromechanical ("MEMS") device and utilizing the determined concentrations of the one or more components to activate a (e.g., downhole) tool.

BACKGROUND

Natural resources such as gas, oil, and water residing in a subterranean formation or zone are usually recovered by drilling a wellbore down to the subterranean formation while circulating a drilling fluid in the wellbore. During wellbore servicing operations, the composition one or more components of a fluid, such as a wellbore servicing fluid or a formation fluid, can be useful in deciding when to activate or actuate a (e.g., downhole) tool. Accordingly, it is desirable to provide systems and methods for determining a concentration of one or more components of a fluid encountered during such wellbore servicing operations, such that a tool can be activated based on the determining of the concentration of the one or more components.

BRIEF SUMMARY OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
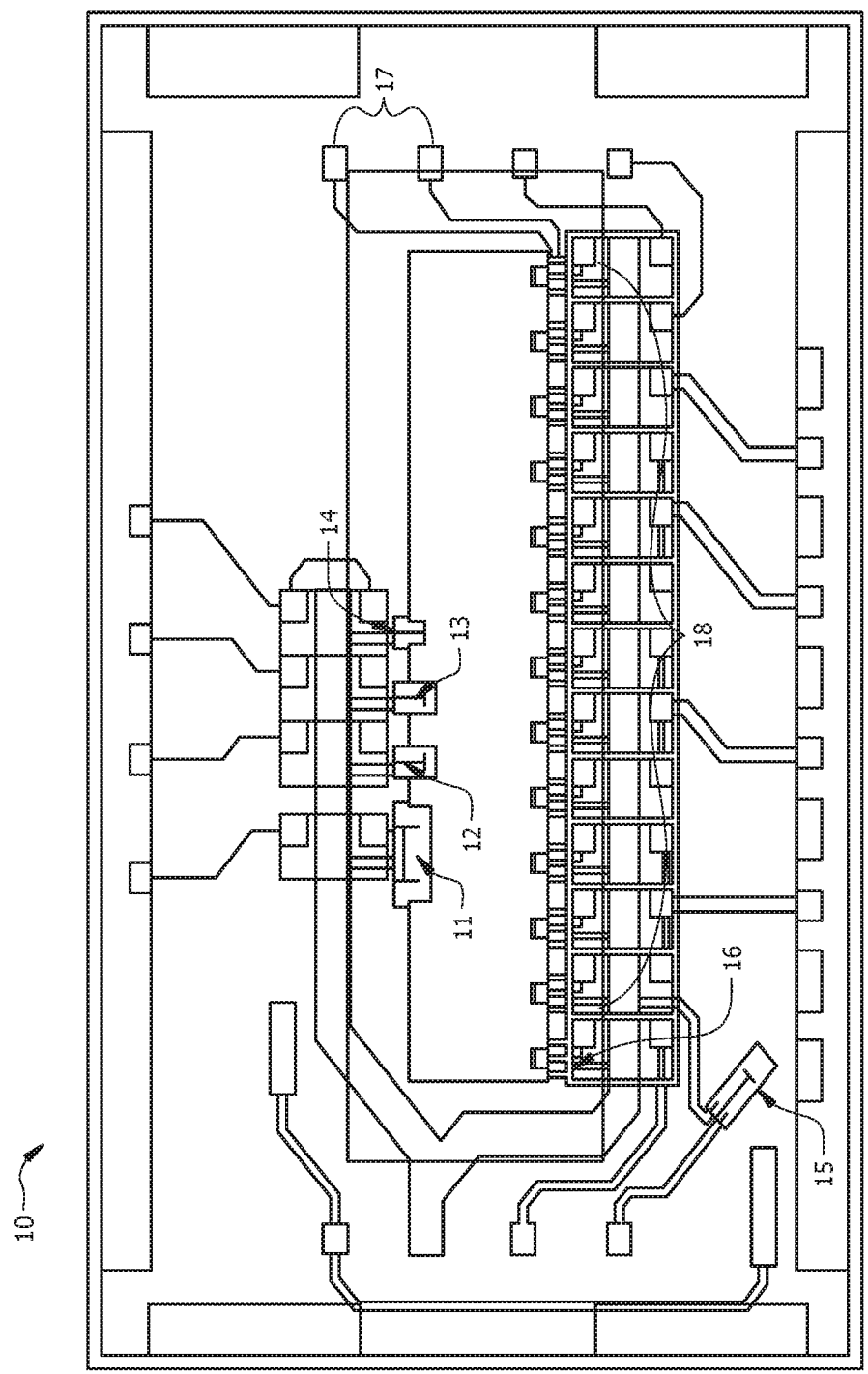
FIG. 1 is a schematic of a sensor or "molecular property spectrometer (MPS)" chip suitable for use in the method of this disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The terms "actuation" and "activation", when utilized in reference to a tool, are utilized interchangeably herein to refer to causing of a mechanical operation (e.g., opening or closing of a valve) to be performed by the tool.

Use of the term "tool" herein refers to any uphole or downhole apparatus that can perform a mechanical operation that can be actuated via a trigger signal provided to the uphole or downhole apparatus, wherein the trigger signal is based on the concentration of the one or more components of a fluid determined by analysis of a sample of the fluid with a MEMS device as described hereinbelow. Although at times referred to as a "downhole" tool 110, it is to be understood that the system and method of this disclosure can involve actuation of an uphole or downhole tool 110 via the trigger signal provided via the MEMS device.

A descriptor numeral can be utilized generically herein to refer to any embodiment of that component. For example, as detailed hereinbelow with reference to FIG. 5, generic reference to a "tool 110" can indicate any uphole or downhole tool 110, a mechanical operation of which can be activated via a MEMS device, as described herein. For example, a tool 110 can refer to a downhole tool 110 including a focused sampling system configured for focused formation sampling, as described with reference to FIG. 5 in Example 1, a downhole tool 110' including an inflow control device (ICD) 302 configured for inflow control, as described in Example 2, a downhole tool 110" including an inflow control valve (ICV) 305 configured for inflow control, as described in Example 3, and so on.

Disclosed herein is a wellbore servicing method including: determining a concentration of one or more components of a fluid during a wellbore servicing operation; and providing a trigger signal to actuate mechanical operation of a tool based on the determining of the concentration of the one or more components. The tool can be an uphole or downhole tool. According to this disclosure, the determining of the concentration of the one or more components includes contacting a sample of the fluid with a microelectromechanical system (MEMS) device to provide a sample response indicative of the concentration of the one or more components. In aspects, the wellbore servicing method of this disclosure enables the composition of a fluid encountered during the wellbore servicing operation (e.g., a formation fluid, a completion fluid, a fracturing fluid, a cementing fluid, etc.) to be determined in real time, whereby adjustments to the wellbore servicing operation (e.g., the drilling operation, the completions operation, the fracturing operation, the cementing operation, etc.) can be taken, via actuation or activation of a tool, to control and/or optimize performance of the wellbore servicing operation. In aspects, the method enables at least partial automation of the activation of the tool based on the determining of the concentration of the one or more components. The MEMS device can provide analytical quality data regarding the chemical content/composition of the fluid.

Figure 2:
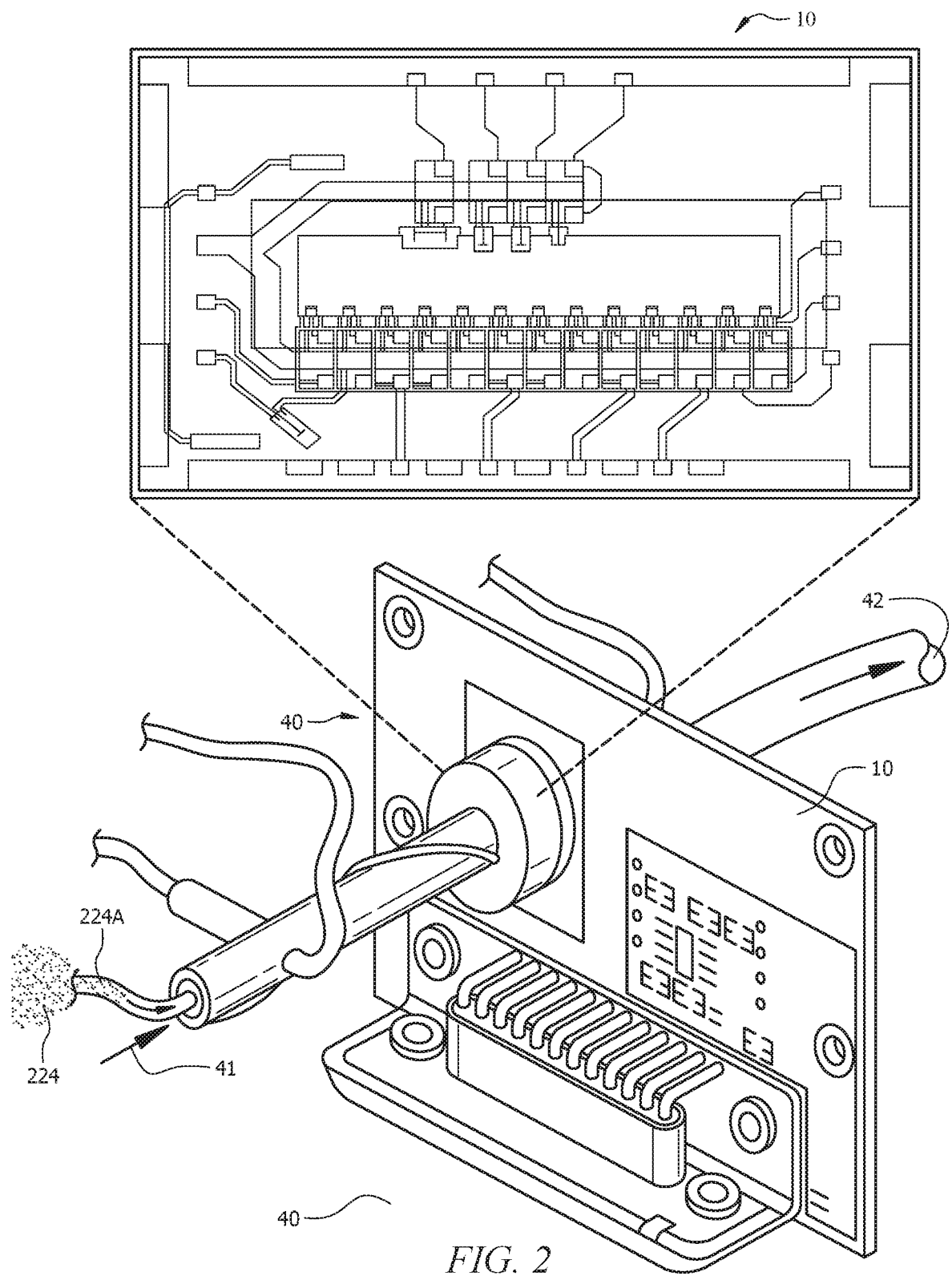
FIG. 2 is a schematic of a MEMS device including a chip of FIG. 1.

The MEMS device can include a sensor having microcantilever-based self-sensing array (SSA) technology. Such a sensor may also be referred to herein as a "molecular property spectrometer chip", an "MPS chip", an "MEMS chip", or simply a "chip". FIG. 1 is a schematic of a sensor or MPS chip 10 suitable for use in the method of this disclosure. Sensor or MPS chip 10 of FIG. 1 includes a surface stress sensor 11, a calorimeter 12 (e.g., a polymer coated calorimeter 12), a thermometer calorimeter 13, an anemometer 14, a thermistor 15, a thermobalance 16, an impedance sensor 17, and polymer coated thermobalances 18. One or a plurality of MPS chips 10 can be incorporated into the MEMS device 40. As depicted in FIG. 2, which is a schematic of a MEMS device 40 including an MPS chip 10, a sample intake line 41 can be utilized to introduce a sample 224A of the fluid 224 (e.g., formation fluid, described with reference to FIG. 5 hereinbelow, produced fluid as described with reference to FIG. 6 and FIG. 7 hereinbelow, WSF 229, etc.) to MEMS device 40, whereby the sample 224A of the fluid 224 can be contacted with the MPS chip 10. A sample outlet line 42 can be utilized to remove the sample 224A of the fluid 224 from the MEMS device 40.

The MEMS device 40 can include a plurality of MPS chips or sensors 10 within a housing. In aspects, the housing includes a housing of a tool 110 (FIG. 5) including the MEMS device 40. For example the MEMS device 40 can be within a formation sampling tool 110 configured to obtain a clean formation fluid sample, in which case, the housing of the formation fluid sampling tool 110 can also provide the housing for the MEMS device 40. In alternative embodiments, for example when MEMS device 40 is outside (e.g., proximate) a tool 110, MEMS device 40 can have its own housing.

A plurality of chips 10 can be utilized to provide redundancy and/or enable a desired frequency of measurement of the concentration of the one or more components of the fluid 224. Utilizing a redundancy of chips 10 can allow for one or more chips 10 being cleaned or purged, while another one or more chips 10 can be online. Cleaning/purging of the chips 10 will depend on the nature of the interaction of the one or more components (e.g., the analyte) with the chip 10 (e.g., with fresh fluid 224, heating (e.g., via piezoresistive heater(s) 48 described hereinbelow with reference to FIG. 3) to flash the analyte off the chip 10, or the like can be utilized to clean spent chips 10 prior to reuse.

Figure 3:
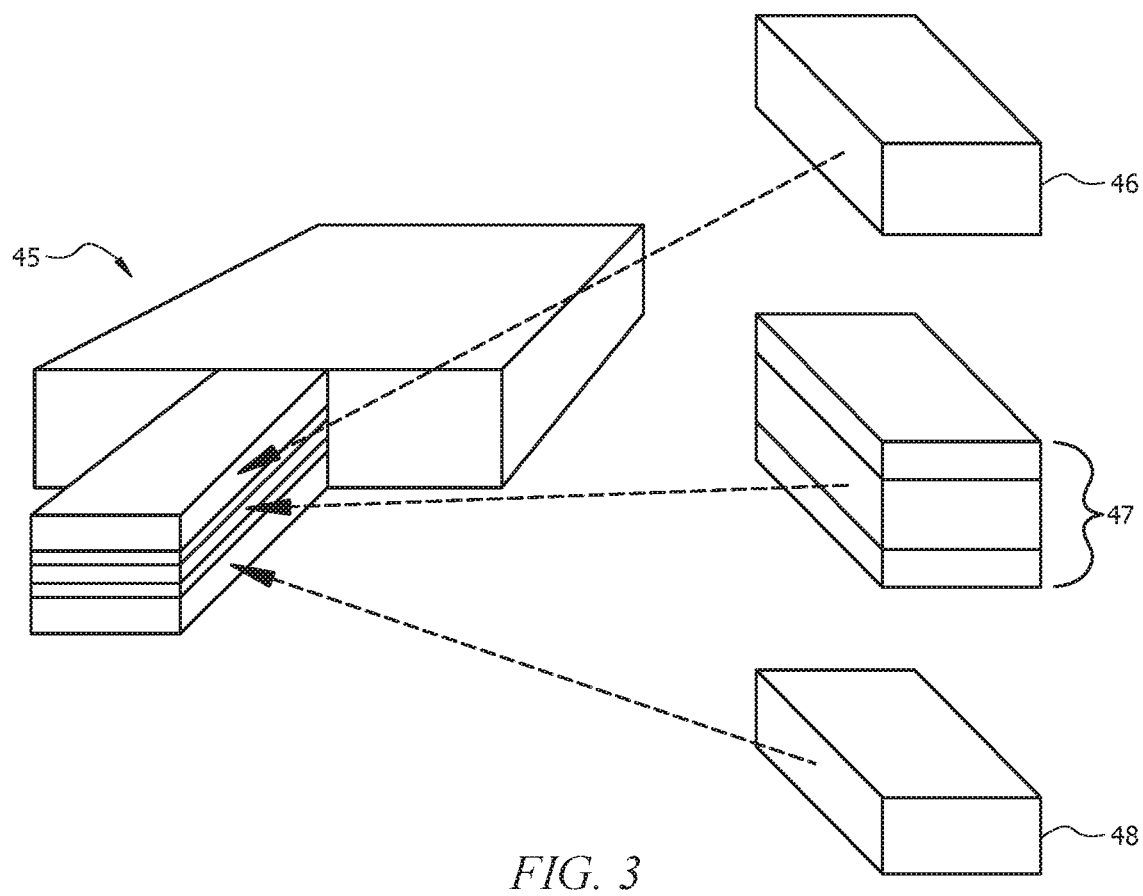
FIG. 3 is a schematic of a cantilever element of a chip of FIG. 1.
Figure 4A:
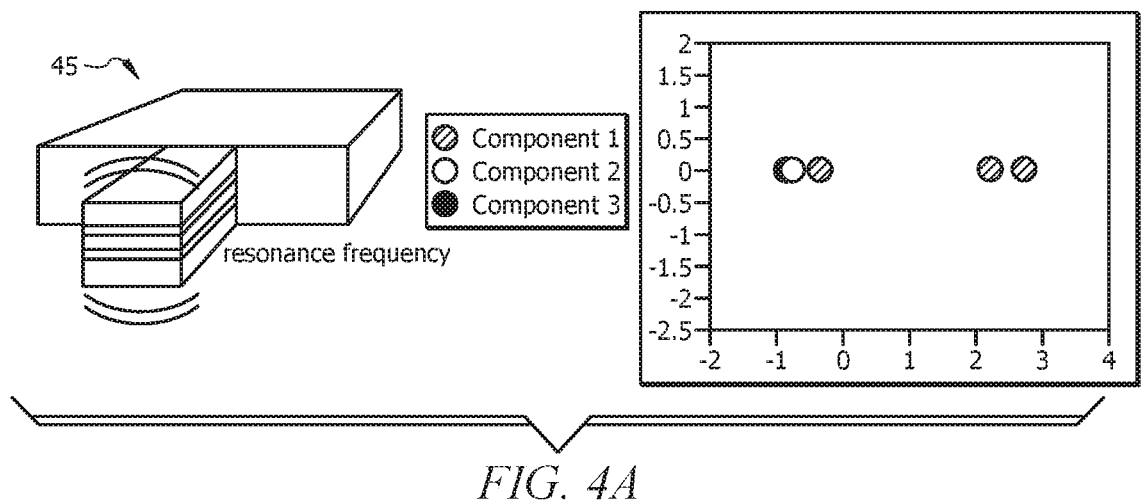
FIG. 4A, FIG. 4B, and FIG. 4C are pictorial representations depicting how resonance frequency (FIG. 4A), resonance frequency and heat (FIG. 4B), and resonance frequency and heat and impedance (FIG. 4C) can be utilized to distinguish one or more components of a fluid.
Figure 4B:
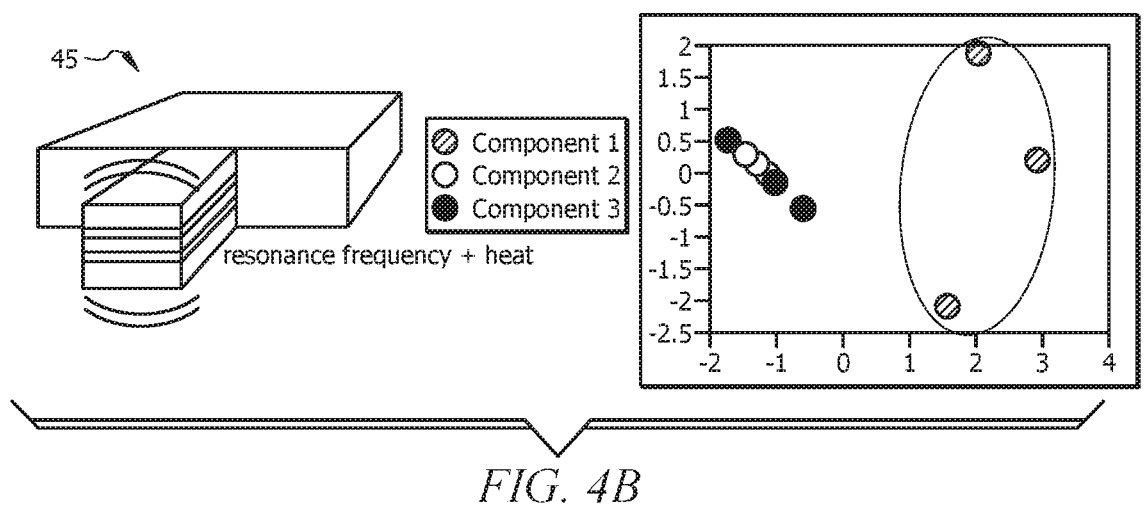
Figure 4C:
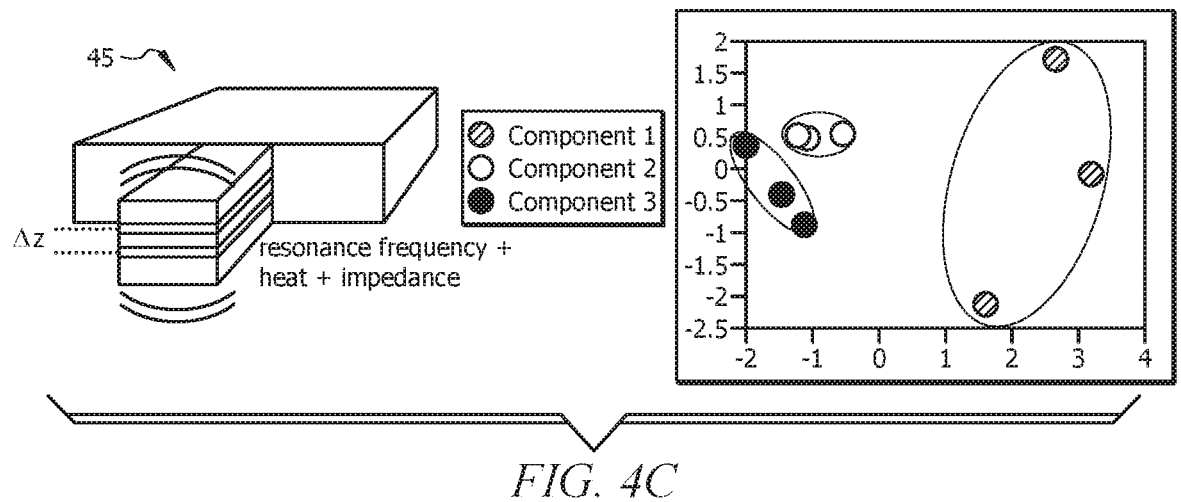

The MEMS device 40 can include an array of cantilever elements (e.g., microcantilevers) with integrated piezoelectric sensing elements that provide electrical actuation and sensing of resonance frequency. For example, FIG. 3 is a schematic of a cantilever element 45. Cantilever element 45 includes coating 46, metal/piezoelectric sandwich 47, and silicon with piezoresistive heater 48. Coating 46 (e.g., a polymer coating 46) can be operable for analyte absorption. Metal/piezoelectric sandwich 47 can provide drive/sense for frequency detection, impedance sensor, and temperature sensor. Piezoresistive heater 48 can provide for heat control (e.g., heat pulses). Resonance frequency, heat, and/or impedance can be utilized to determine the concentration of the one or more components of the fluid 224. For example, FIG. 4A, FIG. 4B, and FIG. 4C are pictorial representations depicting the characteristic resonance that various configurations of cantilever element 45 can provide (resonance frequency (FIG. 4A), resonance frequency and heat (FIG. 4B), and resonance frequency and heat and impedance (FIG. 4C)). The resonances can be utilized to distinguish one or more components of the fluid 224.

The array of microcantilevers 45 can include, for each of the one or more components, one or more microcantilevers 45 including a coating 46 sensitive to an analyte specific to the each of the one or more components (e.g., specific to the component itself or otherwise indicative of the component). As depicted in FIG. 3, the coating 46 of at least a portion of the array of microcantilevers 45 can include a polymer. The MEMS device 40 can include a plurality of complementary chemical cantilevers 45 on each of the one or the plurality of MPS chips or sensors 10.

In embodiments, the MEMS device 40 includes a Molecular Property Spectrometer™ (MPS) chip 10, such as available from Nevada Nanotech Systems of Reno, Nev. Such an MPS chip 10 can, in aspects, rapidly (e.g., within a second) create a large, rich dataset of chemical information. Software can be utilized to identify the types of molecules (e.g., one or more components) present in the sample 224A of the fluid 224.

Because the MEMS device 40 is a microelectromechanical system or MEMS device 40, it can have low power consumption, be minute in size (e.g., micrometer or nanometer scale), have a light weight, and be robust for wellbore servicing applications. In aspects, in a span of milliseconds, the sensors 10 can heat to hundreds of degrees Celsius, make a variety of high-precision thermal measurements, and cool down (e.g., to ambient temperature). In aspects, various components of the MEMS device 40 can operate to detect picogram-scale masses and/or measure temperature with 0.01-degree resolution. In aspects, the MEMS device 40 can operate at temperatures in a range of from about −40° C. to 75° C. or higher, and non-condensing humidity levels. In aspects, cooling can be incorporated to cool the electronics.

An MPS chip 10 can incorporate an array of microcantilevers 45 with integrated piezoelectric sensing elements 47 that provide electrical actuation and sensing of resonance frequency. Monitoring resonance is a highly sensitive way to measure very small masses of adsorbed analyte. An array of microcantilevers or sensors 45 can be electrically monitored in a low-cost, robust fashion via the MPS chip 10 due to the piezoelectric configuration provided by the MPS chip 10.

One or more of the microcantilevers 45 can include a built-in resistive heater 48 whereby an assortment of thermal analyses (e.g. Differential Scanning calorimetry or DSC) can be conducted. The resistive heater(s) 48 can allow for the cleaning of each microcantilever 45/MPS chip 10 after processing a sample 224A of the fluid 224 to be analyzed. The resistors 48 can also enable temperature and flow compensation in order to minimize noise and drift of the piezoelectric sensors 47 and further enhance sensitivity.

The selected polymer coatings 46 can have unique chemical and surface interactions with the test sample 224A of the fluid 224. These unique chemical and surface interactions can be manifested in the resonant frequency of the each cantilever element 45 in the MPS chip 10. By using many different coatings 46, the resonance frequency response of each cantilever element 46 can be designed to provide a unique signature for the chemical properties of the sample 224A. Any suitable coating 46 that interacts with an analyte (e.g., each of the one or more components of the fluid 224) to change the resonance frequency can be utilized. The type of interactions can include sorption (e.g., the analyte (e.g., the component of the fluid 224) adsorbs or absorbs on the coating 46), dissolution/solvation (the analyte dissolves or solvates the coating 46), precipitation (the analyte precipitates on the coating 46) and/or other interactions. The chemistry and concentration of the sample 224A of the fluid 224 may be determined using this technology. Additionally, the MEMS device 40 can provide a heat source (e.g., piezoelectric heater 48) that allows the signature to be thermally responsive. In some cases, impedance can be included (e.g., via metal/piezoelectric sandwich 47) in the MEMS device 40 to better differentiate chemical species and concentration.

To facilitate a better understanding of the present invention, the following examples of certain embodiments are given. In no way should the following examples be read to limit, or define, the scope of the invention. One or more embodiments of the present disclosure may be applicable to any type of wellbore services operation including, but not limited to, exploration, services, drilling services, or production operation for any type of well site or reservoir environment including subsurface and subsea environments.

The fluids analyzed by the MEMS device 40 according to this disclosure can include a variety of fluids encountered in drilling operations (for instance, formation fluids), completions operations, production operations, cementing operations, or the like. The methods and tools can be extended for use in other contexts as well. For example, wellbore servicing fluids can be used in a variety of subterranean operations, including stimulation treatments, conformance treatments, lost circulation treatments, hydraulic fracturing treatments, acidizing treatments, remediation treatments, scale removal treatments, scale inhibition treatments, and the like. Use of these terms herein does not imply any particular action by the fluid or any particular component thereof.

As used herein, the term "flow path" refers to a route through which any fluid is capable of being transported between at least two points. In one or more embodiments, the flow path need not be continuous or otherwise contiguous between the two points. Exemplary flow paths include, but are not limited to, a flow line, a pipeline, production tubing, drill string, work string, casing, a wellbore, an annulus defined between a wellbore and any tubular arranged within the wellbore, a mud pit, a subterranean formation, any other suitable flow path, combinations thereof, or the like. The term "flow path" does not necessarily imply that a fluid is flowing therein; rather, a fluid is capable of being transported or otherwise flowable therethrough.

According to one or more aspects of the present disclosure, an information handling system or computer equipment may be employed. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Description of a wellbore servicing system of this disclosure will now be made with reference to FIG. 5, which is a schematic diagram of a wellbore servicing system 200, according to one or more aspects of this disclosure. In aspects, the fluid 224 includes a fracturing fluid, a cementitious fluid, a remedial fluid, a perforating fluid, a sealant, a drilling fluid, a drill-in fluid, a spacer fluid, a completion fluid, a gravel pack fluid, a diverter fluid, a gelation fluid, a polymeric fluid, an aqueous fluid, an oleaginous fluid, a brine based fluid, a produced fluid, a focused formation fluid, or a combination thereof. In aspects, the fluid 224 includes a wellbore servicing fluid (WSF) or "treatment" fluid 229. For example, a wellbore servicing fluid 229 can be introduced into a wellbore 218 at a volumetric flow rate of greater than or equal to about 3, 10, 20, 30, or 40 barrels per minute (BPM), or in a range of from about 3 to about 40, from about 3 to about 20, from about 10 to about 20, or from about 5 to about 20 BPM. Although depicted as a drilling operation in FIG. 5, including tool 110 as a component of a bottom hole assembly 248, it is to be understood that tool 110 can be any downhole apparatus for which a mechanical operation can be actuated as described herein based on the concentration of the one or more components of the fluid 224 determined via the MEMS device 40. For example, and without limitation, tool 110 can be a valve operated during a wellbore servicing operation, a wireline tool, a drilling (e.g., measuring while drilling (MWD), logging while drilling (LWD)) tool, a tree (e.g., a Christmas tree, a subsea production tree), or another downhole component of a wellbore servicing system, for which a mechanical operation (e.g., valve opening) can be triggered by a signal based on a parameter (e.g., a concentration of one or more components of the fluid 224) measured by the MEMS device 40.

The one or more components of the fluid 224 for which the concentration is determined during the wellbore servicing operation can include any component of the fluid 224 for which knowledge of the concentration of the one or more components in the fluid 224 is desired and for which component or "analyte" a MEMS device 40 is operable to detect (i.e., the MEMS device 40 includes one or more microcantilever elements 45 having a coating 46 sensitive to the component).

For example, and without limitation, the one or more components can include a triggering component of the fluid, a chemical tracer), an oil, water, a gas, a contaminant, or a combination thereof. For example, in aspects, the one or more components include a chemical tracer, and, in such aspects, the method can further include adding the chemical tracer to the fluid prior to pumping the fluid downhole, introducing the chemical tracer downhole independently of the fluid, or a combination thereof. In this manner, detection of a certain concentration of the chemical tracer at one or more locations downhole via one or a plurality of MEMS devices 40 can be utilized to trigger mechanical actuation of a tool 110. In aspects, a triggering component can be a component that initiates an action downhole, such as, for example, a delayed acid release, or a thermally activated cross-linker. In aspects, the one or more components include fluid additives of standard fluids, such as, for example, viscosifiers, shale inhibitors, thinners, weighting agents, emulsifiers, fluid loss control agents, LCMs, etc. In aspects, the one or more components include a chemical tracer, which can be a material specifically incorporated into the fluid that is benign to its surroundings, but trackable via the MEMS device 40.

In alternative or additional aspects, one or a plurality of MEMS devices 40 can be utilized to determine a concentration of oil, water, and/or gas in the fluid 224. In such aspects, the oil to water and/or to gas ratios (e.g., the oil to water ratio, the oil to gas ratio, the water to gas ratio, and/or the oil to water to gas ratio) can be calculated and values thereof compared to triggering values. When the triggering value(s) are met, a triggering signal can be sent (directly from MEMS device 40 and/or via controllers, such as controllers 243) to the (e.g., uphole or tool) 110 to actuate it. In alternative aspects, the one or more components include a contaminant. For example, the contaminant can include a contaminant of a virgin formation fluid of formation 220. In such aspects, described further hereinbelow with reference to FIG. 5, a downhole MEMS device 40 can be utilized to determine when a virgin or "clean" focused formation fluid sample has been obtained by a tool 110 including a focused sampling device. Once the contaminant level measured by the MEMS device 40 is below a desired or "triggering" amount, a triggering signal can be sent to the focused sampling device 110, to actuate the focused sampling device 110 to take one or more samples of the focused formation fluid (for return to a surface 240 of the wellbore 218 for further uphole analysis) and/or to utilize the or another MEMS device 40 to determine a concentration of one or more components of the focused formation fluid sample from formation 220.

The tool 110 actuated by the triggering signal based on the concentration of the one or more components of the fluid 224 determined by the MEMS device 40 can be any of a number of tools 110, as will be apparent to those of skill in the art and with the help of this disclosure. A number of nonlimiting examples will be provided hereinbelow. For example, and without limitation, the tool 110 can include a formation fluid sampling device, a fracturing plug, a valve, a cement head, an inflow control device (ICD), a Christmas tree (e.g., a subsea production tree), a formation evaluation device, a electrocrush drilling bit and power assembly, a downhole NMR, a flow diverter, a generator, a capacitor, a reamer, a fluid heating device, a microwave generating device, or a combination thereof. The valve can include, for example, a bypass valve, an inflow control valve, or a casing valve (e.g., a fracturing valve). The tool 110 can be a drilling tool, such as an LWD tool or a MWD tool, a wireline tool, a completions tool, a production tool, etc.

The MEMS device 40 can be positioned proximate, adjacent, and/or within the tool 110, in aspects. Alternatively, the MEMS device 40 can be located some distance from the tool 110 to be actuated by the triggering signal based on the concentration of the one or more components of the fluid 224 determined by the MEMS device 40.

The one or more components of the fluid 224 for which concentration is determined via the MEMS device 40 can include, for example, a chemical additive or chemical tracer, water, a gas, a hydrocarbon, a salt, or a combination thereof. In aspects, the one or more components include a shale inhibitor, a lubricant, an emulsifier, a viscosifier, a thinner, a polymer, a gas, an oil, a hydrocarbon, water, a biocide, a salt, a corrosion inhibitor, a defoamer, a flocculant, a deflocculant, a foamer, a non-emulsifier, a cleaner, a casing wash material, a combination thereof, or the like. A MEMS device 40 can be configured to detect a plurality of components of the fluid 224, in aspects. A plurality of MEMS devices 40 can be utilized, in embodiments, as described further hereinbelow.

In aspects the determining of the concentration of the one or more components of the fluid 224 can further include: after contacting the sample 224A with the MEMS device 40 to provide the sample response, providing a treated sample by treating the sample 224A (e.g., or a volume of fluid 224 from which the sample 224A is taken) to selectively alter a response of the MEMS device 40 thereto; contacting the treated sample with the MEMS device 40 to provide a treated sample response; and utilizing a difference between the treated sample response and the sample response with calibration curves to determine the concentration of the one or more components of the fluid 224. A variety of treatments can be utilized. Without limitation, treating to provide the treated sample can include treating with a chemical additive that selectively alters the response of the MEMS device 40. The chemical additive can include, for example, an acid, a base, an enzyme, an oxidizer, a reducer, and anti-oxidant, an oxygen scavenger, a free radical source, a free radical trap, a chemical reactant, a surfactant, a precipitant, a flocculant, a deflocculant or a combination thereof. In aspects, treating the sample can include, treating with UV light, IR light, visible spectrum light, ultrasonic treatment, heat, microwaves, x-rays, laser light or a combination thereof.

The sample 224A of the fluid 224 can include a solids-reduced sample 224A of the fluid 224, wherein the solids-reduced sample 224 of the fluid 224 includes a reduced amount of solids relative to the fluid 224 from which the sample 224A is obtained. A solids reduced sample 224A of the fluid 224 can be obtained via a variety of methods, such as, without limitation, filtering or centrifuging the fluid 224 from which the sample 224A is obtained to provide the solids-reduced sample 224A of the fluid 224. In aspects, fluid filtrate (e.g., drilling fluid filtrate) can be collected through standard filtration testing, and the solids-reduced sample of the fluid 224 can include the fluid filtrate (e.g., drilling fluid filtrate). This may allow for analysis of the concentration of salt, shale inhibitor, and/or other small molecule additives, such as, without limitation, biocides and corrosion inhibitors in water-based fluids. The presence of water in an oil-based filtrate can also be assayed, in aspects. While potentially fewer additives may be quantified in this manner, compatibility of the sample 224A and the MEMS device 40 may be greater via utilization of a solids-reduced sample 224A.

The method can further include carrying out the determining of the concentration of the one or more components of the fluid 224 at a certain frequency, for example, at least once every sampling time period. For example, the sampling time period can be in a range of from about 0.01 to about 24 hours, from about 1 minute to about 15 hours, or from about 0.5, 1, 2, 3, 4, 5, 6, 7, 8, 9, or 10 minutes to about 0.1, 0.2, 0.3, 0.4, 0.5, 0.6, 0.7, 0.8, 0.9, 1, 2, 3, 4, 5, 6, 7, 8, 9, 10, 15, or 20 hours. Any desired sampling frequency can be utilized via utilization of an appropriate number and arrangement of chips 10 and/or MEMS devices 40.

The concentration of the one or more components of the fluid 224 determined via the MEMS device 40 can be utilized to calculate a parameter of the fluid 224. In such aspects, the activating of the tool 110 based on the determining of the concentration of the one or more components can include activating the tool 110 based on a value of the parameter. For example, as noted above, the parameter can include a ratio of two or more components of the fluid 224, such as, without limitation, an oil to water ratio (OWR) of the fluid 224, a density of the fluid 224, an emulsifier content, a water phase salinity (e.g., salt content of the water phase), a shale inhibitor content, a viscosifier content, a fluid loss additive content, a thinner content, a surfactant content, a combination thereof, or the like.

As noted above, FIG. 5 illustrates wellbore servicing system 200, including wellbore monitoring system 210, that may employ one or more of the methods described herein in order to characterize a fluid composition to activate a tool 110, according to one or more embodiments. The exemplary wellbore servicing system 200 includes a drilling platform 202 that supports a derrick 204 having a traveling block 206 for raising and lowering a drill string 208. A kelly 212 supports the drill string 208 as it is lowered through a rotary table 214. A drill bit 216 is attached to the distal end of the drill string 208 and is driven either by a downhole motor and/or via rotation of the drill string 208 from the well surface 240. As the drill bit 216 rotates, it creates a wellbore 218 that penetrates various subterranean formation(s) 220. The example wellbore 218 shown in FIG. 5 includes a vertical wellbore. However, a wellbore servicing system 200 may include any combination of horizontal, vertical, slant, curved, or other wellbore orientations.

A pump 222 (for example, a mud pump) circulates wellbore servicing fluid 229 through a feed pipe 226 and to the kelly 212, which conveys the wellbore servicing fluid 229 downhole (in the direction indicated by arrow A1) through an interior conduit 252 defined in the drill string 208 and through one or more orifices 223 in the drill bit 216. The wellbore servicing fluid 229 is then circulated back to the surface 240 via an annulus 228 (in a direction indicated by arrow A2) defined between the drill string 208 and the walls of the wellbore 218. The route through which wellbore servicing fluid 229 circulates may be described using one or more fluid flow paths 219. In one or more embodiments, operation of wellbore servicing system 200 can include diverting wellbore servicing fluid 229 to fluid reclamation equipment 232 and optimizing associated fluid reclamation equipment 232. The WSF 229 returned to the surface 240 can be introduced into one or more mud pits 265, from which it can subsequently be pumped back to interior conduit 252 via pump(s) 222 and feed pipe 226.

The wellbore servicing fluid 229 may carry out several functions, such as, without limitation, lubrication of drill bit 216 and the mechanical removal of cuttings and solids. Alternatively, the WSF 229 can include a cementitious fluid utilized during cementing operations, or another treatment fluid. The wellbore servicing fluid 229 may be any wellbore servicing fluid known to those skilled in the art. In one or more embodiments, for example, the wellbore servicing fluid 229 may be or include water, such as a brine or the like, known to those skilled in the art. The wellbore servicing fluid 229 may be or include, but is not limited to, municipal treated or fresh water, sea water, salt water (for example, water containing one or more salts dissolved therein) naturally-occurring brine, a chloride-based, bromide-based, or formate-based brine containing monovalent and/or polyvalent cations, aqueous solutions, non-aqueous solutions, base oils, and any combination thereof. Examples of chloride-based brines include lithium chloride sodium chloride, zinc chloride and calcium chloride. Examples of bromide-based brines include sodium bromide, calcium bromide, and zinc bromide. Examples of formate-based brines include sodium formate, potassium formate, and cesium formate.

In aspects, the wellbore servicing fluid 229 can have monovalent and/or polyvalent cations, alkali and alkaline earth metals, or combinations thereof. Additional examples of suitable salts include NaCl, KCl, NaBr, $CaCl_2$, $CaBr_2$, $MgCl_2$, $MgBr_2$, $ZnBr_2$, acetate salts, sodium acetate, potassium acetate, calcium nitrate, ammonium chloride ($NH_4Cl$), potassium phosphate, sodium formate, potassium formate, cesium formate, or combinations thereof. In an aspect, the WSF 229 includes a brine including the salt.

In an aspect, the base fluid of WSF 229 includes an aqueous fluid. Aqueous fluids that may be used in the WSF include any aqueous fluid suitable for use in subterranean applications, provided that the aqueous fluid is compatible with the other components (e.g., shale inhibitor) used in the WSF 229. For example, the aqueous fluid may include water or a brine. In an aspect, the aqueous fluid includes an aqueous brine. In an aspect, the WSF 229 suitable for use in the present disclosure may include any suitable salt(s). In such aspect, the aqueous brine generally includes water and an inorganic monovalent salt, an inorganic multivalent salt, or both. The aqueous brine may be naturally occurring or artificially-created. Water present in the brine may be from any suitable source, examples of which include, but are not limited to, sea water, tap water, freshwater, water that is potable or non-potable, untreated water, partially treated water, treated water, produced water, city water, well-water, surface water, liquids including water-miscible organic compounds, and combinations thereof. The salt or salts in the water may be present in an amount ranging from greater than about 0% by weight to a saturated salt solution, alternatively from about 1 wt. % to about 30 wt. %, or alternatively from about 5 wt. % to about 10 wt. %, based on the weight of the salt solution. In an aspect, the salt or salts in the water may be present within the base fluid in an amount sufficient to yield a saturated brine. As will be appreciated by one of skill in the art, and with the help of this disclosure, the type and concentration of salt solutions utilized as a base fluid is dependent on the WSF 229 density (e.g., drilling fluid density, completion fluid density, etc.), which may range, without limitation, from about 8 lb/gallon to about 20 lb/gallon, alternatively from about 10 lb/gallon to about 18 lb/gallon, or alternatively from about 12 lb/gallon to about 16 lb/gallon.

Nonlimiting examples of aqueous brines suitable for use in the present disclosure include chloride-based, bromide-based, phosphate-based or formate-based brines containing monovalent and/or polyvalent cations, salts of alkali and alkaline earth metals, or combinations thereof. Additional examples of suitable brines include, but are not limited to brines including salts such as LiCl, NaCl, KCl, NaBr, $CaCl_2$, $CaBr_2$, $MgCl_2$, $MgBr_2$, $ZnCl_2$, $ZnBr_2$, acetate salts, sodium acetate, potassium acetate, ammonium chloride ($NH_4Cl$), potassium phosphate, calcium nitrate sodium formate, potassium formate, cesium formate, or combinations thereof. In an aspect, the base fluid includes a brine.

In an aspect, the base fluid of the WSF 229 includes an emulsion. In such aspect, the emulsion can be an oil-in-water emulsion including a non-oleaginous (e.g., an aqueous fluid of the type previously described herein) continuous phase and an oleaginous (e.g., an oil-based fluid, such as for example an oleaginous fluid) discontinuous phase. Oleaginous fluids that may be used in the WSF 229 include any oleaginous fluid suitable for use in subterranean applications, provided that the oleaginous fluid is compatible with the other components utilized in the WSF 229. Examples of oleaginous fluids suitable for use in a WSF 229 include, but are not limited to, petroleum oils, natural oils, synthetically-derived oils, oxygenated fluids, or combinations thereof. In an aspect, the oleaginous fluid includes diesel oil, kerosene oil, mineral oil, synthetic oils, aliphatic hydrocarbons, polyolefins (e.g., alpha olefins, linear alpha olefins and/or internal olefins), paraffins, silicone fluids, polydiorganosiloxanes, oxygenated solvents, esters, diesters of carbonic acid, alcohols, alcohol esters, ethers, ethylene glycol, ethylene glycol monoalkyl ether, ethylene glycol dialkyl ether, or combinations thereof, wherein the alkyl groups are methyl, ethyl, propyl, butyl, and the like.

The base fluid may be present within the WSF 229 in any suitable amount. For example, the base fluid may be present within the WSF 229 in an amount of from about 10 wt. % to about 99 wt. %, alternatively from about 20 wt. % to about 95 wt. %, or alternatively from about 40 wt. % to about 90 wt. %, based on the total weight of the WSF 229. Alternatively, the base fluid may include the balance of the WSF 229 after considering the amount of the other components used. As will be appreciated by one of skill in the art, and with the help of this disclosure, the amount of base fluid (e.g., aqueous base fluid) in the WSF 229 depends on the desired density of the WSF 229.

In aspects, the WSF 229 includes solids. For example, WSF 229 can be a drilling fluid, the density of which can be provided using a solid material such as, without limitation, barite, hematite, calcium carbonate, or the like. In aspects, the WSF 229 can have up to about 20, 30, or 35 volume percent (vol %) of such solid components. In such aspects, an oil based WSF 229 can include (or primarily include) oil, brine, and weighting materials (e.g., barite), optionally with other components in smaller quantities. In other aspects, the WSF 229 is a water base WSF 229 absent the base oil.

Although various components of a WSF 229 have been described hereinabove, one of skill in the art will appreciate the vast array of WSFs or "treatment fluids" 229 that can be utilized during a wellbore servicing operation. In aspects, any such fluid can make up fluid 224 sampled and analyzed for the concentration of the one or more components thereof via the MEMS device 40, upon which the triggering signal for mechanical operation of the tool 110 is based.

In one or more embodiments, upon returning to the surface and exiting the wellbore 218, the wellbore servicing fluid 229 may be conveyed to one or more servicing fluid reclamation equipment 232 fluidly coupled to the annulus 228. The reclamation equipment 232 may be configured to receive and rehabilitate the wellbore servicing fluid 229 in preparation for its reintroduction into the wellbore 218, if desired. The reclamation equipment 232 may include one or more filters or separation devices configured to clean the wellbore servicing fluid 229. The reclamation equipment 232 may include, for example, a shale shaker, a centrifuge, a diatomaceous earth filter, or the like.

In one or more embodiments, wellbore servicing system 200 can include one or more instrument trucks 236, one or more pump trucks 238, and a wellbore servicing fluid control subsystem 231. The wellbore servicing system 200 may perform one or more wellbore servicing operations.

The one or more pump trucks 238 may include any one or more of one or more mobile vehicles, one or more immobile installations, one or more skids, one or more hoses, one or more tubes, one or more fluid tanks, one or more fluid reservoirs, one or more pumps, one or more valves, one or more mixers, or any other one or more types of structures and equipment. The one or more pump trucks 238 shown in FIG. 5 can supply wellbore servicing fluid 229 or other materials for the wellbore servicing operation. The one or more pump trucks 238 may convey the wellbore servicing fluid 229 downhole through the interior conduit 252 defined in the drill string 208 and through one or more orifices in the drill bit 216, for example.

The one or more instrument trucks 236 may include mobile vehicles, immobile installations, or other structures. The one or more instrument trucks 236 shown in FIG. 5 include a wellbore servicing fluid control subsystem 231 that controls or monitors the wellbore servicing operation applied by the wellbore servicing system 200. One or more communication links 242 may communicatively couple the one or more instrument trucks 236 to the one or more pump trucks 238, or other equipment at a ground surface 240. In one or more embodiments, the one or more communication links 242 may communicatively couple the one or more instrument trucks 236 to one or more controllers 243 disposed at or about the wellbore, one or more sensors (such as surface sensors 258 and downhole sensors 260, which can include one or more MEMS devices 40 as described herein), other one or more data collection apparatus in the wellbore servicing system 200, remote systems, other well systems, any equipment installed in the wellbore 218, other devices and equipment, or a combination thereof. In one or more embodiments, the one or more communication links communicatively couple the one or more instrument trucks 236 to the wellbore monitoring system 210, which may run one or more simulations and record simulation data. The wellbore servicing system 200 may include a plurality of uncoupled communication links 242 or a network of coupled communication links 242. The communication links 242 may include direct or indirect, wired or wireless communications systems, or combinations thereof.

The wellbore servicing system 200 may also include one or more surface sensors 258 and one or more downhole sensors 260 to measure a pressure, a rate, a temperature, a wellbore servicing fluid composition, and any other parameters of wellbore servicing operations. According to this disclosure, at least one of the surface sensors 258 or the downhole sensors 260 includes a MEMS device 40, as described hereinabove, operable to determine the concentration of the one or more components of the fluid 224. Surface sensors 258 and downhole sensors 260 may include meters or other equipment that measure properties of one or more fluids in the wellbore 218 at or near the ground surface 240 level or at other locations. The wellbore servicing system 200 may include one or more pump controls 262 or other types of controls for starting, stopping, increasing, decreasing or otherwise controlling pumping as well as controls for selecting or otherwise controlling fluids pumped during the wellbore servicing operation. The wellbore servicing fluid control subsystem 231 may communicate with the one or more of one or more surface sensors 258, one or more downhole sensors 260, the one or more MEMS devices 40, one or more pump controls 262, and other equipment to monitor and control the wellbore servicing operation.

The wellbore monitoring system 210 may include one or more information handling systems located at the wellbore 218 or any one or more other locations. The wellbore monitoring system 210 or any one or more components of the wellbore monitoring system 210 may be located remote from any one or more of the other components shown in FIG. 5. For example, the wellbore monitoring system 210 may be located at a data processing center, a computing facility, or another suitable location. The wellbore servicing system 200 may include additional or different features, and the features of the wellbore servicing system 200 may be arranged as shown in FIG. 5 or in another configuration.

Figure 5:
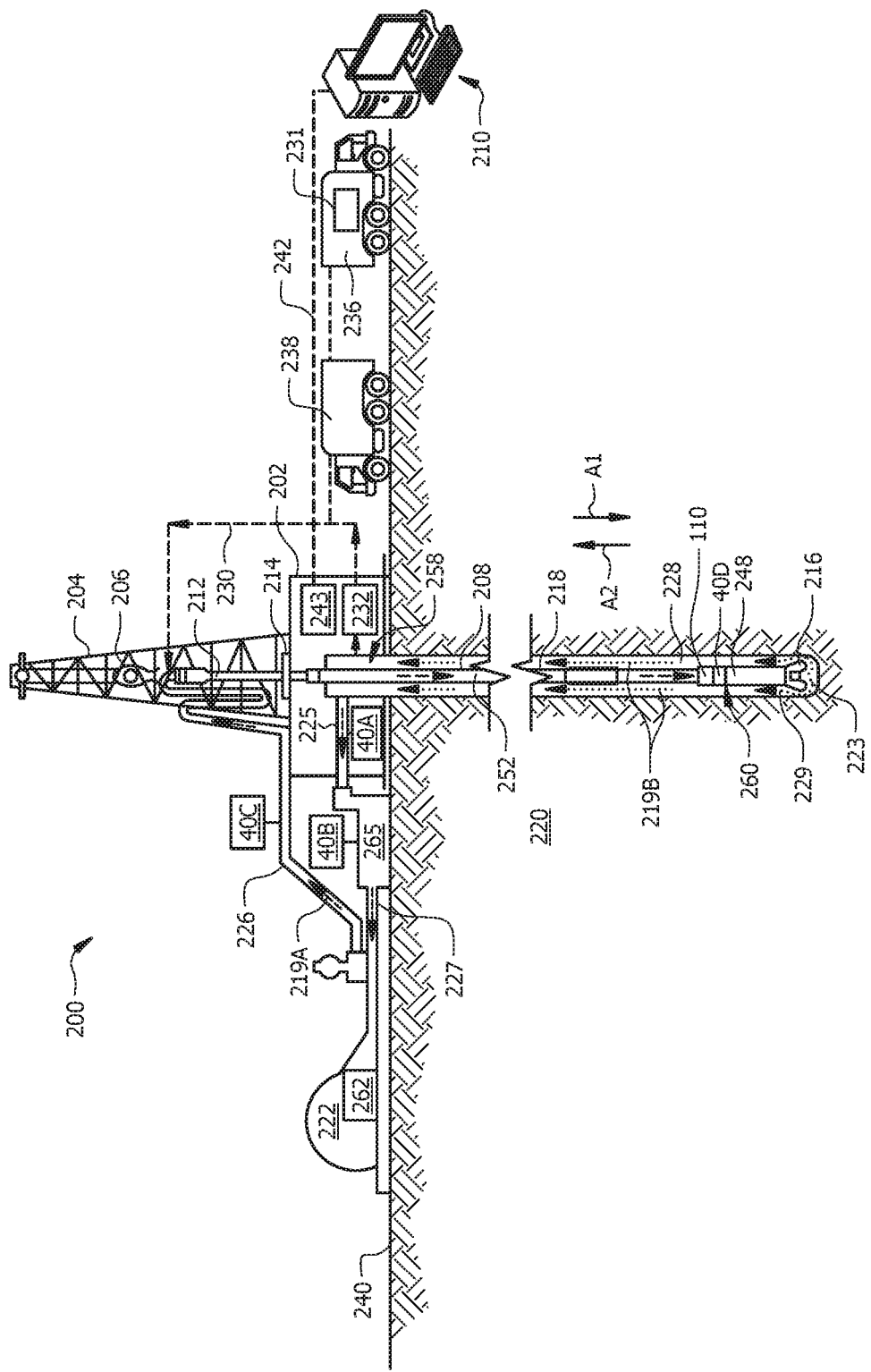
FIG. 5 is a schematic diagram of a wellbore servicing system, according to one or more aspects of this disclosure.

In one or more embodiments, the wellbore servicing fluid control subsystem 231 shown in FIG. 5 controls operation of the wellbore servicing system 200. The wellbore servicing fluid control subsystem 231 may include one or more data processing equipment, one or more communication equipment, or other systems that control the circulation and/or composition of the wellbore servicing fluids 224 through the wellbore 218. The wellbore servicing fluid control subsystem 231 may be communicatively linked or communicatively coupled to the wellbore monitoring system 210, which may calculate, select, or optimize wellbore servicing operation parameters. The wellbore servicing fluid control subsystem 231 may receive, generate or modify a wellbore servicing operation plan (for example, a pumping schedule, a wellbore servicing fluid composition, an additive dosing, etc.) that specifies parameters of a wellbore servicing operation to be applied to the wellbore 218.

The method of this disclosure includes activating tool 110 based on the determining of the concentration of the one or more components. Such activating can be manual or automated. In aspects, an uphole tool can be activated via the determined concentration of the one or more components of the fluid 224 by the MEMS device 40. For example, the wellbore servicing fluid control subsystem 231 may select or modify (for example, increase or decrease) one or more compositions of the wellbore servicing fluid 229 (e.g., a dosing rate/amount of one or more of the one or more components of the wellbore servicing fluid 229), one or more densities of the wellbore servicing fluid 229, one or more viscosities of the wellbore servicing fluid 229, and one or more other control parameters based on data provided by the MEMS device (s) 40. In one or more embodiments, data provided by the one or more MEMS device(s) 40 may be measured and the measurements and/or results calculated therefrom displayed in real time during the wellbore servicing operation, for example, to an engineer or other operator of the wellbore servicing system 200. An appropriate response (e.g., activating of tool 110, no action, etc.) can be determined and effected either manually or automatically.

In one or more embodiments, the techniques and operations described herein may be implemented by one or more information handling systems configured to provide the functionality described. In various instances, a computing system may include any of various types of devices, including, but not limited to, personal computer systems, desktop computers, laptops, notebooks, mainframe computer systems, handheld computers, workstations, tablets, application servers, computer clusters, distributed computing systems, storage devices, or any type of computing or electronic device.

The determining of the concentration of the one or more components can include, for a plurality of MEMS devices 40, contacting a sample of the fluid with the MEMS device 40 to provide a plurality of sample responses indicative of the concentration of the one or more components. The determining of the concentration of the one or more components can be performed on samples of the fluid 224 taken at a plurality of locations along a flow path (e.g., flow path 219B of FIG. 5) of the fluid 224. The plurality of locations can include, for example, a first downhole location and a second downhole location, wherein the first downhole location includes a location along a length of the wellbore 218, and wherein the second downhole location includes another location along the length of the wellbore 218, wherein the first location and the second location are at different distances from a surface 240 of the wellbore 218.

The sample 224A of fluid 224 can be being taken from a volume of the fluid 224 prior to introduction of the volume of the fluid 224 into the wellbore 218 (e.g., a focused formation sample, as described in Example 1 hereinbelow) or subsequent passage of the volume of the fluid in the wellbore 218 (e.g., a WSF or treatment fluid 229 introduced downhole).

A plurality of MPS chips 10/MEMS device(s) 40 can be utilized to provide concentration data of the fluid 224, and resulting triggering of the tool 110, in real time.

The method can further include monitoring a trend in the determined concentration of one or more components of the fluid 224, and utilizing the monitoring of the trend in the activating of the tool 110. Trending of the concentration of the one or more components of the fluid 224 can be utilized to understand and/or predict future events, concentration(s) of the one or more components, fluid inflows, or the like.

In aspects, the method can include determining a composition of a subterranean fluid, such as a formation fluid, and adjusting operating conditions and/or determining a composition of a wellbore servicing fluid and providing optimal additive dosing via a MEMS device, as described, respectively, in U.S. patent application Ser. No. 16/879,170, entitled, "Methods to Characterize Subterranean Fluid Composition and Adjust Operating Conditions Using MEMS Technology", and U.S. patent application Ser. No. 16/879, 167, entitled, "Methods to Characterize Wellbore Fluid Composition and Provide Optimal Additive Dosing Using MEMS Technology", which are being filed concurrently herewith, and the disclosure of each of which is hereby incorporated herein in its entirety for purposes not contrary to this disclosure.

Also disclosed herein is a method of actuating a mechanical operation of a tool 110 during a wellbore servicing operation of a wellbore 218, the method including: positioning one or a plurality of MEMS devices 40 within the wellbore 218; determining a concentration of one or more components of a fluid 224 encountered during the wellbore servicing operation; and providing a trigger signal to actuate the mechanical operation of the tool 110 based on the determining of the concentration of the one or more components of the fluid 224, wherein the determining of the concentration of the one or more components of the fluid 224 includes contacting a sample 224A of the fluid 224 with the MEMS device 40 to provide a sample response indicative of the concentration of the one or more components of the fluid 224. Providing of the trigger signal to actuate the mechanical operation of the tool 110 based on the determining of the concentration of the one or more components of the fluid 224 can further include sending a signal to actuate the mechanical operation of the tool 110 when the concentration of the one or more components of the fluid 224 is greater than, less than, or equal to a trigger amount of the one or more components. In aspects, positioning the one or the plurality of MEMS devices 40 within the wellbore 218 can include positioning the one or the plurality of the MEMS devices 40 within or proximate the tool 110. In aspects, positioning the one or the plurality of MEMS devices 40 within the wellbore 218 can include positioning the one or the plurality of the MEMS devices 40 along a length of the wellbore 218, for example, along a length of a casing, a tubular, a drill string 208, etc.

As noted hereinabove, the activating of the tool 110 based on the determining of the concentration of the one or more components of the fluid 224 can be at least partially automated. The determining the concentration of one or more components of the fluid 224 in the one or more samples 224A of the fluid 224 can be performed substantially in real time.

Also disclosed herein is a system (e.g., wellbore servicing system 200) for servicing a wellbore 218. The system include at least one MEMS device 40 operable for determining a concentration of one or more components of a fluid 224 via a sample response indicative of the concentration of the one or more components, wherein the sample response is obtained via contact of a sample 224A of the fluid 224 with the MEMS device 40 during the wellbore servicing operation; and a tool 110 that is actuated based on the determined concentration of the one or more components. The tool 110 can be actuated by a trigger signal (e.g., from the MEMS device 40) based on the determined concentration of the one or more components. The at least one MEMS device 40 can be located uphole or downhole. The system can include a plurality of MEMS devices 40, wherein each of the plurality of MEMS devices 40 can be operable for determining a concentration of one or more components of the fluid 224 via a sample response indicative of the concentration of the one or more components, wherein the sample response is obtained via contact of a sample 224A of the fluid 224 with the MEMS device 40 during the wellbore servicing operation. The plurality of MEMS devices 40 can be distributed along a length of the wellbore 218, for example, along a length of a casing or tubular. The system can provide real time determining of the concentration of the one or more components of the fluid 224, and/or can be at least partially automated, in aspects.

Those of ordinary skill in the art will readily appreciate various benefits that may be realized by the present disclosure. The herein disclosed method provides for determining a concentration of one or more components of a fluid 224 encountered during a wellbore servicing operation; and activating (or not activating) a tool 110 based on the determining of the concentration of the one or more components, wherein the determining of the concentration of the one or more components includes contacting a sample 224A of the fluid 224 with a MEMS device 40 to provide a sample response indicative of the concentration of the one or more components. The method can enable real time and/or automated activating of the tool 110.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

EXAMPLES

Example 1: Formation Fluid Sampling

In aspects, sample 224A of fluid 224 is a focused sample of formation fluid from formation 220. Such a focused sample of formation fluid can be obtained by any methods known to those of skill in the art. For example, a focused sample can be obtained as described, in U.S. patent application Ser. No. 16/670,886, filed Oct. 31, 2019, and entitled, "Focused Formation Sampling Method and Apparatus", or U.S. patent application Ser. No. 16/879,170 being filed concurrently herewith, and entitled, "Methods to Characterize Subterranean Fluid Composition and Adjust operating Conditions Using MEMS Technology", the disclosure of each of which is hereby incorporated herein in its entirety for purposes not contrary to this disclosure. For example, in such aspects, tool 110 of FIG. 5 can include a focused sampling device operable to take a focused sample (for use as sample 224A of fluid 224) of formation fluid from formation 220. MEMS device 40 can be within or adjacent the focused sampling device 110, in such aspects. The MEMS device 40 can be utilized to determine when the formation fluid being sampled by the tool 110 is sufficiently clean (e.g., has a concentration of one or more contaminants below a triggering level), such that sampling of the formation fluid can be taken. In such aspects, triggering of the tool can include sending a triggering signal to actuate the tool 110 to take one or more samples of the clean formation fluid in one or more ample chambers for retrieval uphole for further analysis (e.g., via an uphole MEMS device 40) and/or to perform downhole analysis of the clean formation sample (e.g., via the or another MEMS device 40). The downhole analysis can be performed in real time and/or recorded. In some such aspects, a MEMS device 40 on wireline/coil tubing/drill pipe can be employed to test wellbore fluids instead of retrieving a sample to surface 240 for surface analysis.

Example 2: Chemical Tracer in Spacer

In aspects, a chemical tracer is introduced into a spacer ahead of a treatment for a target zone in a wellbore 218. In such aspects, a MEMS device 40, as described herein, can be employed to determine the concentration of the chemical tracer that has reached the target zone. That is, in such embodiments, the one or more components of the fluid includes the chemical tracer and the fluid 224 includes the spacer fluid. Once the concentration of the chemical tracer reaches a triggering level, activating of the tool 110 can be effected. For example, in such aspects, the tool 110 can include one or more valves, for example, a first valve, a second valve, and a third valve. The configuration of each of the valves can be triggered to open or closed positions by the triggering signal based on the concentration of the one or more components of the spacer fluid 224 determined by the MEMS device 40. In this manner, treatment fluid introduced into wellbore 218 subsequent the spacer fluid containing the chemical tracer can be directed as desired within wellbore 218.

Example 3: Inflow Control Device (ICD)

In aspects, one or a plurality of MEMS devices 40 are positioned within one or more zones of a wellbore 218. Each of the MEMS devices 40 can be utilized to measure the oil to gas and/or to water (e.g., the oil to water, oil to gas, water to gas ratio, and/or oil to water to gas ratios; referred to hereinafter for brevity as oil/water/gas or "O/W/G" ratios) in the one or more zones. Triggering signals based on the determined oil/water/gas ratios can be utilized to configure the inflow control device (ICD) of each zone in a desired configuration, for example, open, choke, or closed. The ICDs can include shut off valves.

Figure 6:
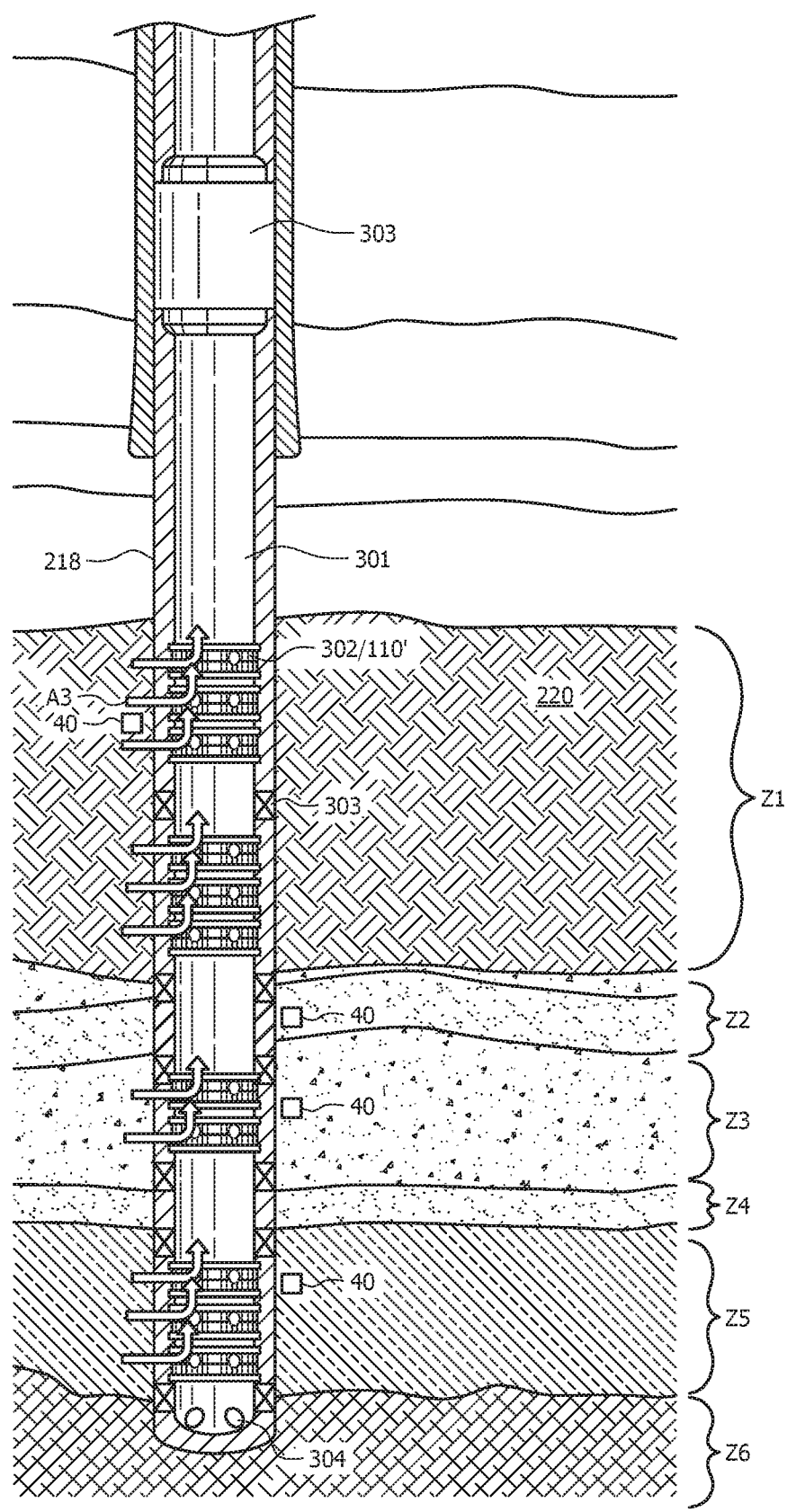
FIG. 6 is a schematic of a wellbore during wellbore servicing operations, as described in Example 3.

For example, FIG. 6 is a schematic of a wellbore 218 extending through a plurality of zones, including first zone Z1, second zone Z2, third zone Z3, fourth zone Z4, fifth zone Z5, and sixth zone Z6. Production liner or tubing 301, extending from hanger 303 to plug 304, includes ICDs 302 (operable as the tool(s) 110', in these aspects) operable to allow fluid flow, as indicated by the arrows A3. Packers 303 can be utilized to isolate the zones and/or sets of ICDs within the zones. One or more MEMS devices 40 (not shown to scale in FIG. 6) can be positioned proximate the ICDs 302 and utilized to determine the O/W/G ratio(s) in one or more zones having ICDs (e.g., first zone Z1, third zone Z3, and fifth zone Z5 of FIG. 6), and the ICDs 302 in the respective zones actuated based on the O/W/G ratio(s) determined by the MEMS device(s) 40. One or more (e.g., one or a plurality of) MEMS device 40 can be positioned within each zone (e.g., first zone Z1, second zone Z2, third zone Z3, fourth zone Z4, fifth zone Z5, and/or sixth zone Z6). In aspects, one or more zones Z having ICDs (e.g., first zone Z1, third zone Z3, and fifth zone Z5 of FIG. 6) include one or a plurality of MEMS devices 40. One or more of the formation zones Z can include no MEMS devices 40. Each of the MEMS device(s) 40 within each zone Z including the MEMS device(s) 40 can be operable to control isolation and/or selection of each formation zone Z for production.

Example 4: Inflow Control Valve (ICV)

In aspects, one or a plurality of MEMS devices 40 are positioned within one or more zones of a wellbore 218. Each of the MEMS devices 40 can be utilized to measure the oil/water/gas ratios in the one or more zones. Triggering signals based on the determined oil/water/gas ratios can be utilized to configure the inflow control valve (ICV) of each zone in a desired configuration, for example, open, choke, or closed. The ICDs can include sleeve type valves.

Figure 7:
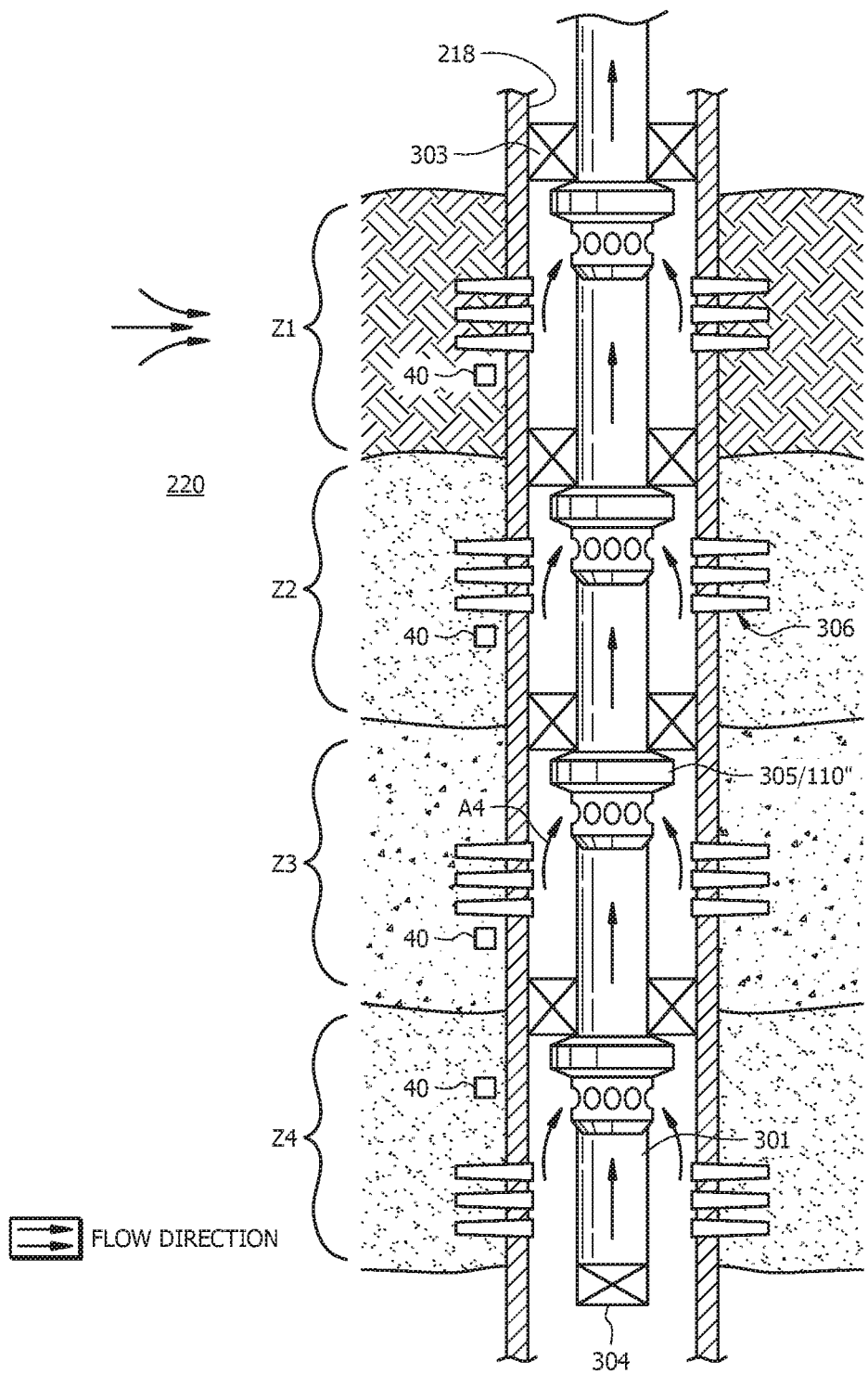
FIG. 7 is a schematic of a wellbore during wellbore servicing operations, as described in Example 4.

For example, FIG. 7 is a schematic of a wellbore 218 extending through a plurality of zones, including first zone Z1, second zone Z2, third zone Z3, and fourth zone Z4, with completions 306. Production liner or tubing 301, extending from plug 304, includes ICVs 305 operable to allow fluid flow, as indicated by the arrows A4. Packers 303 can be utilized to isolate the zones and/or sets of ICVs within the zones. One or more MEMS devices 40 can be utilized to determine the O/W/G ratio(s) in one or more zones having ICVs (e.g., first zone Z1, second zone Z2, third zone Z3, and fourth zone Z4 of FIG. 7), and the ICVs in the respective zones actuated based on the O/W/G ratio(s) determined by the MEMS device(s) 40. The ICVs 305 (operable as the tool(s) 110", in these aspects) can be controlled from the surface 240 as part of an intelligent well package. The MEMs device(s) 40 can be placed near the inlet of each inflow control valve 305, for example, to measure the oil/gas/water ratio. Depending on a desired level of discrete control, multiple locations can include MEMS device(s) 40. For example, one or a plurality of MEMS devices 40 (not shown to scale in FIG. 7) can be positioned within each of the formation zones Z (e.g., first zone Z1, second zone Z2, third zone Z3, and fourth zone Z4 of FIG. 7). One or more of the formation zones Z can include no MEMS devices 40. The action taken (e.g., the mechanical operation of opening, closing, or choking) by the ICVs 305 can be automatic or communicated from surface 240.

Example 5: Fracture Valves

In aspects, casing valves are cemented in with a casing string. One or more MEMS devices 40 can be utilized to monitor well flow for a tracer material fractured into the formation 220. In such aspects, the casing valve(s) can be activated open or closed based on the concentration of the tracer material detected. In aspects, such an approach can also be utilized with valves run on sand screens, wherein a tracer material can be added under the sand screen. In these aspects, the one or more components for which the concentration is determined by the MEMS device 40 can include the tracer material, and the fluid 224 can include the fluid inflow.

Example 6: Christmas Tree

In aspects, the tool 110 includes a Christmas tree, such as, without limitation, a subsea production tree. In such aspects, the one or more components of the fluid 224 can include the concentration of oil, water, and/or gas, and the one or more MEMS devices 40 can be utilized to determine the oil/gas/water ratio(s) at the subsea tree, and trigger an appropriate response (e.g., via activation of a tool 110).

Example 7: Wellsite Production

In aspects, one or more MEMS devices 40 are utilized to measure the oil/gas/water ratio(s) at a well pad or at a production platform. In such aspects, the one or more MEMS device(s) 40 can be positioned proximate the well pad or the production platform, and utilized to measure the oil, water, and/or gas content of the produced fluid, whereby the OWG ratio(s) can be determined. The determined OWG ratio(s) can trigger a mechanical operation, such as, without limitation, a choke valve.

Example 8: Cement Head

In aspects, a chemical is introduced into a fluid (e.g., a cementitious fluid) being pumped downhole. Detection of the chemical via the MEMS device(s) 40 can trigger, for example, a cement head. In such embodiments, the one or more components for which concentration is determined by the MEMS device(s) 40 include the chemical. In this manner, the use of ball drop mechanisms conventionally utilized in such operations can be avoided. By way of example, in some such aspects, the chemical detected via the MEMS device(s) 40 can include aniline.

Example 9: Frac Plugs

In aspects, a series of materials can be utilized with fracturing ("frac") plugs to sequentially activate a series of frac plugs. Detection of a specific material of the series in a fluid being introduced into the wellbore 218 can be utilized to activate a specifically sized frac plug. In this manner, a series of frac plugs can be triggered for activation by MEMS devices 40 positioned within the wellbore 218. Via this method, a rate of setting frac plugs can be increased relative to conventional methods. In such aspects, the one or more components of the fluid 224 include the series of materials. For example, a first frac plug can be triggered based on a concentration of a first material of the series of materials determined by a first MEMS device 40 sensitive to the first material of the series of materials, a second frac plug can be triggered based on a concentration of a second material of the series of materials determined by a second MEMS device 40 sensitive to the second material of the series of materials, a third frac plug can be triggered based on a concentration of a third material of the series of materials determined by a third MEMS device 40 sensitive to the third material of the series of materials, and so on.

Example 10: Diverting of Fluid

In aspects, tool 110 includes a bypass valve. For example, one or more MEMS devices 40 can be utilized to activate a bypass valve to divert fluid from BHA 248. In some such aspects, one or more MEMS devices 40 positioned proximate the BHA 248 can be utilized to detect one or more components of the fluid proximate the BHA 248, and, when the one or more components are detected, the fluid can be diverted from the BHA 248 by activation of the diverter valve.

ADDITIONAL DISCLOSURE

The following are non-limiting, specific embodiments in accordance with the present disclosure:

In a first embodiment, a method comprises: determining a concentration of one or more components of a fluid during a wellbore servicing operation of a wellbore; and providing a trigger signal to actuate mechanical operation of a tool based on the determining of the concentration of the one or more components, wherein the determining of the concentration of the one or more components comprises contacting a sample of the fluid with a microelectromechanical system (MEMS) device to provide a sample response indicative of the concentration of the one or more components.

A second embodiment can include the method of the first embodiment, wherein the tool is a downhole tool.

A third embodiment can include the method of any one of the first or second embodiments, wherein the MEMS device comprises a sensor having microcantilever-based self-sensing array (SSA) technology.

A fourth embodiment can include the method of the third embodiment, wherein the sensor comprises an array of microcantilevers with integrated piezoelectric sensing elements that provide electrical actuation and sensing of resonance frequency.

A fifth embodiment can include the method of the fourth embodiment, wherein the array of microcantilevers include, for each of the one or more components, one or more microcantilevers comprising a coating sensitive to an analyte specific to the each of the one or more components.

A sixth embodiment can include the method of the fifth embodiment, wherein the coating of at least a portion of the array of microcantilevers comprises a polymer.

A seventh embodiment can include the method of any one of the first to sixth embodiments, wherein the sample response is provided via resonance frequency, heat, impedance, or a combination thereof within the MEMS device.

An eighth embodiment can include the method of any one of the first to seventh embodiments, wherein the MEMS device is proximate and/or within the tool.

A ninth embodiment can include the method of any one of the first to eighth embodiments, wherein the determining of the concentration of the one or more components comprises, for a plurality of MEMS devices, contacting a sample of the fluid with the MEMS device to provide a plurality of sample response indicative of the concentration of the one or more components.

A tenth embodiment can include the method of any one of the first to ninth embodiments, wherein the one or more components comprise a triggering component of the fluid, a chemical tracer, a fluid additive, oil, water, gas, or a combination thereof.

An eleventh embodiment can include the method of the tenth embodiment, wherein the one or more components comprise the chemical tracer, and wherein the method further comprises adding the chemical tracer to the fluid prior to pumping the fluid downhole, introducing the chemical tracer downhole independently of the fluid, or a combination thereof.

A twelfth embodiment can include the method of any one of the first to eleventh embodiments, wherein the tool comprises a formation fluid sampling device, a fracturing plug, a valve, a cement head, an inflow control device (ICD), a formation evaluation device, a electrocrush drilling bit and power assembly, a downhole NMR, a generator, a capacitor, a reamer, a Christmas tree (e.g., a subsea production tree), a fluid heating device, a microwave generating device, or a combination thereof.

A thirteenth embodiment can include the method of the twelfth embodiment, wherein the valve comprises a bypass valve, an inflow control valve (ICV), or a casing valve (e.g., a fracturing valve).

A fourteenth embodiment can include the method of any one of the first to thirteenth embodiments, wherein the determining of the concentration of the one or more components is performed on samples of the fluid taken at a plurality of locations along a flow path of the fluid.

A fifteenth embodiment can include the method of the fourteenth embodiment, wherein the plurality of locations include a first downhole location and a second downhole location, wherein the first downhole location comprises a location along a length of the wellbore, and wherein the second downhole location comprises another location along the length of the wellbore, wherein the first location and the second location are at different distances from a surface of the wellbore.

A sixteenth embodiment can include the method of any one of the first to fifteenth embodiments, wherein the determining of the concentration of the one or more components of the fluid further comprises: after contacting the sample with the MEMS device to provide the sample response, providing a treated sample by treating the sample to selectively alter a response of the MEMS device; contacting the treated sample with the MEMS device to provide a treated sample response; and utilizing a difference between the treated sample response and the sample response with calibration curves to determine the concentration of the one or more components of the fluid.

A seventeenth embodiment can include the method of the sixteenth embodiment, wherein treating the sample further comprises treating the sample with a chemical additive that selectively alters the response of the MEMS device, subjecting the sample to ultraviolet light, ultrasonic treatment of the sample, IR light, visible spectrum light, heat, microwave, x-rays, or a combination thereof.

An eighteenth embodiment can include the method of the seventeenth embodiment, wherein the chemical additive comprises an acid, a base, an enzyme, an oxidizer, a reducer, and anti-oxidant, an oxygen scavenger, a free radical source, a free radical trap, a chemical reactant, a surfactant, a precipitant, a flocculant, a deflocculant, or a combination thereof.

A nineteenth embodiment can include the method of any one of the first to eighteenth embodiments, wherein the sample of the fluid comprises a solids-reduced sample of the fluid, wherein the solids-reduced sample of the fluid comprises a reduced amount of solids relative to the fluid from which the sample is obtained.

A twentieth embodiment can include the method of the nineteenth embodiment further comprising filtering or centrifuging the fluid from which the sample is obtained to provide the solids-reduced fluid.

A twenty first embodiment can include the method of any one of the first to twentieth embodiments further comprising carrying out the determining at least once every sampling time period, wherein the sampling time period is in a range of from 0.01 to 24 hours.

A twenty second embodiment can include the method of any one of the first t twenty first embodiments, wherein the fluid comprises a wellbore servicing fluid.

A twenty third embodiment can include the method of the twenty second embodiment, wherein the wellbore servicing fluid comprises a fracturing fluid, a cementitious fluid, a remedial fluid, a perforating fluid, a sealant, a drilling fluid, a drill-in fluid, a spacer fluid, a completion fluid, a gravel pack fluid, a diverter fluid, a gelation fluid, a polymeric fluid, an aqueous fluid, an oleaginous fluid, or a combination thereof.

A twenty fourth embodiment can include the method of the twenty third embodiment, wherein the wellbore servicing fluid is introduced into the wellbore at a volumetric flow rate of greater than or equal to about 3, 10, 20, 30, or 40 barrels per minute (BPM), or in a range of from about 3 to about 40, from about 3 to about 20, from about 10 to about 20, or from about 5 to about 20 BPM.

A twenty fifth embodiment can include the method of any one of the first to twenty third embodiments further comprising calculating a parameter of the fluid based on the determined concentration of the one or more components.

A twenty sixth embodiment can include the method of the twenty fifth embodiment, wherein the parameter comprises an oil to water and/or to gas ratio (O/W/G ratio) of the fluid, a solids concentration of the fluid, or a combination thereof.

A twenty seventh embodiment can include the method of any one of the first to twenty sixth embodiments, wherein the activating of the tool is at least partially automated.

A twenty eighth embodiment can include the method of any one of the first to twenty seventh embodiments, wherein the determining the concentration of one or more components of the fluid is performed substantially in real time.

A twenty ninth embodiment can include the method of any one of the first to twenty eighth embodiments further comprising monitoring a trend in the determined concentration of one or more components of the fluid, and utilizing the monitoring of the trend in the activating of the tool.

In a thirtieth embodiment, a method of actuating a mechanical operation of a tool during a wellbore servicing operation of a wellbore comprises: positioning one or a plurality of microelectromechanical system (MEMS) devices within the wellbore; determining a concentration of one or more components of a fluid encountered during the wellbore servicing operation; and providing a trigger signal to actuate the mechanical operation of the tool based on the determining of the concentration of the one or more components, wherein the determining of the concentration of the one or more components comprises contacting a sample of the fluid with the MEMS device to provide a sample response indicative of the concentration of the one or more components.

A thirty first embodiment can include the method of the thirtieth embodiment, wherein the providing of the trigger signal to actuate the mechanical operation of the tool based on the determining of the concentration of the one or more components further comprises sending a signal to actuate the mechanical operation of the tool when the concentration of the one or more components is greater than, less than, or equal to a trigger amount of the one or more components.

A thirty second embodiment can include the method of any one of the thirtieth or thirty first embodiments, wherein positioning the one or the plurality of MEMS devices within the wellbore comprises positioning the one or the plurality of the MEMS devices within or proximate the tool.

In a thirty third embodiment, a system for servicing a wellbore comprises: at least one microelectromechanical system (MEMS) device operable for determining a concentration of one or more components of a fluid via a sample response indicative of the concentration of the one or more components, wherein the sample response is obtained via contact of a sample of the fluid with the MEMS device during a wellbore servicing operation; and a tool that is actuated based on the determined concentration of the one or more components.

A thirty fourth embodiment can include the system of the thirty third embodiment, wherein the at least one MEMS device is located uphole or downhole.

A thirty fifth embodiment can include the system of any one of the thirty third or thirty fourth embodiments, comprising: a plurality of MEMS devices, wherein each of the plurality of MEMS devices is operable for determining a concentration of one or more components of the fluid via a sample response indicative of the concentration of the one or more components, wherein the sample response is obtained via contact of a sample of the fluid with the MEMS device during the wellbore servicing operation.

A thirty sixth embodiment can include the system of the thirty fifth embodiment, wherein the plurality of MEMS devices are distributed along a length of the wellbore.

A thirty seventh embodiment can include the system of any one of the thirty third to thirty sixth embodiments, wherein the system provides real time determining of the concentration of the one or more components of the fluid.

A thirty eighth embodiment can include the system of any one of the thirty third to thirty seventh embodiments, wherein the system is at least partially automated.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as includes, includes, having, etc. should be understood to provide support for narrower terms such as consisting of, consisting essentially of, included substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

We claim:

1. A method comprising:
   determining a concentration of one or more components of a fluid during a wellbore servicing operation of a wellbore; and
   providing a trigger signal to actuate operation of a tool based on the determining of the concentration of the one or more components, wherein the tool comprises a formation fluid sampling device, a fracturing plug, a cement head, an inflow control device (ICD), a formation evaluation device, an electrocrush drilling bit and power assembly, a downhole NMR, a generator, a capacitor, a reamer, a Christmas tree, a fluid heating device, a microwave generating device, or a combination thereof, wherein the determining of the concentration of the one or more components comprises contacting a sample of the fluid with a microelectromechanical system (MEMS) device to provide a sample response indicative of the concentration of the one or more components, wherein the MEMS device comprises a sensor having microcantilever-based self-sensing array (SSA) technology, wherein the sensor comprises an array of microcantilevers with integrated piezoelectric sensing elements that provide electrical actuation and sensing of resonance frequency, wherein each microcantilever comprises a piezoelectric sensing element sandwiched between a built-in resistive heater and a coating, such that resonance frequency, heat, and/or impedance is utilized to determine the concentration of the one or more components of the fluid.

2. The method of claim 1, wherein the tool is a downhole tool.

3. The method of claim 1, wherein the array of microcantilevers include, for each of the one or more components, one or more microcantilevers comprising a coating sensitive to an analyte specific to the each of the one or more components.

4. The method of claim 1, wherein the MEMS device is proximate and/or within the tool.

5. The method of claim 1, wherein the determining of the concentration of the one or more components comprises, for a plurality of MEMS devices, contacting a sample of the fluid with the MEMS device to provide a plurality of sample response indicative of the concentration of the one or more components.

6. The method of claim 1, wherein the one or more components comprise a triggering component of the fluid, a chemical tracer, a fluid additive, oil, water, gas, or a combination thereof.

7. The method of claim 1, wherein the determining of the concentration of the one or more components is performed on samples of the fluid taken at a plurality of locations along a flow path of the fluid.

8. The method of claim 1, wherein the fluid comprises a wellbore servicing fluid.

9. The method of claim 1 further comprising calculating a parameter of the fluid based on the determined concentration of the one or more components.

10. The method of claim 1, wherein the tool comprises a formation fluid sampling device, a fracturing plug, a cement head, a formation evaluation device, an electrocrush drilling bit and power assembly, a downhole NMR, a generator, a capacitor, a reamer, a Christmas tree, a fluid heating device, a microwave generating device, or a combination thereof.

11. The method of claim 1, wherein the coating of each of the microcantilevers is sensitive to an analyte specific to one of the one or more components.

12. A method of actuating an operation of a tool during a wellbore servicing operation of a wellbore, the method comprising:

positioning one or a plurality of microelectromechanical system (MEMS) devices within the wellbore, wherein the one or the plurality of MEMS devices each comprise a sensor having microcantilever-based self-sensing array (SSA) technology, wherein the sensor comprises an array of microcantilevers with integrated piezoelectric sensing elements that provide electrical actuation and sensing of resonance frequency, wherein each microcantilever comprises a piezoelectric sensing element sandwiched between a built-in resistive heater and a coating, such that resonance frequency, heat, and/or impedance is utilized to determine the concentration of the one or more components of the fluid;

determining a concentration of one or more components of a fluid encountered during the wellbore servicing operation; and providing a trigger signal to actuate the operation of the tool based on the determining of the concentration of the one or more components, wherein the tool comprises a formation fluid sampling device, a fracturing plug, a cement head, an inflow control device (ICD), a formation evaluation device, an electrocrush drilling bit and power assembly, a downhole NMR, a generator, a capacitor, a reamer, a Christmas tree, a fluid heating device, a microwave generating device, or a combination thereof, wherein the determining of the concentration of the one or more components comprises contacting a sample of the fluid with the MEMS device to provide a sample response indicative of the concentration of the one or more components.

13. The method of claim 12, wherein the providing of the trigger signal to actuate the operation of the tool based on the determining of the concentration of the one or more components further comprises sending a signal to actuate the operation of the tool when the concentration of the one or more components is greater than, less than, or equal to a trigger amount of the one or more components.

14. The method of claim 12, wherein positioning the one or the plurality of MEMS devices within the wellbore comprises positioning the one or the plurality of the MEMS devices within or proximate the tool.

15. A system for servicing a wellbore, the system comprising:

at least one microelectromechanical system (MEMS) device operable for determining a concentration of one or more components of a fluid via a sample response indicative of the concentration of the one or more components, wherein the sample response is obtained via contact of a sample of the fluid with the MEMS device during a wellbore servicing operation, wherein the MEMS device comprises a sensor having microcantilever-based self-sensing array (SSA) technology, wherein the sensor comprises an array of microcantilevers with integrated piezoelectric sensing elements that provide electrical actuation and sensing of resonance frequency, wherein each microcantilever comprises a piezoelectric sensing element sandwiched between a built-in resistive heater and a coating, such that resonance frequency, heat, and/or impedance is utilized to determine the concentration of the one or more components of the fluid; and a tool that is actuated based on the determined concentration of the one or more components, wherein the tool comprises a formation fluid sampling device, a fracturing plug, a cement head, an inflow control device (ICD), a formation evaluation device, an electrocrush drilling bit and power assembly, a downhole NMR, a generator, a capacitor, a reamer, a Christmas tree, a fluid heating device, a microwave generating device, or a combination thereof.

16. The system of claim 15, wherein the at least one MEMS device is located above a surface of the wellbore or below the surface of the wellbore.

17. The system of claim 15 comprising:
a plurality of MEMS devices, wherein each of the plurality of MEMS devices is operable for determining a concentration of one or more components of the fluid via a sample response indicative of the concentration of the one or more components, wherein the sample response is obtained via contact of a sample of the fluid with the MEMS device during the wellbore servicing operation.

18. The system of claim 17, wherein the plurality of MEMS devices are distributed along a length of the wellbore.

19. The system of claim 15, wherein the system provides real time determining of the concentration of the one or more components of the fluid and/or wherein the system is at least partially automated.

20. The system of claim 15, wherein the tool comprises a formation fluid sampling device, a fracturing plug, a cement head, a formation evaluation device, an electrocrush drilling bit and power assembly, a downhole NMR, a generator, a capacitor, a reamer, a Christmas tree, a fluid heating device, a microwave generating device, or a combination thereof.

* * * * *